United States Patent
Pang et al.

(10) Patent No.: US 12,373,440 B2
(45) Date of Patent: Jul. 29, 2025

(54) HIGH-PERFORMANCE KEY-VALUE STORE

(71) Applicant: Alibaba Innovation Private Limited, Singapore (SG)

(72) Inventors: Zhu Pang, Bellevue, WA (US); Qingda Lu, Bellevue, WA (US); Shuo Chen, Bellevue, WA (US); Yikang Xu, Redmond, WA (US); Jiesheng Wu, Redmond, WA (US); Rui Wang, Redmond, WA (US)

(73) Assignee: Alibaba Innovation Private Limited, Singapore (SG)

( * ) Notice: Subject to any disclaimer, the term of this patent is extended or adjusted under 35 U.S.C. 154(b) by 191 days.

(21) Appl. No.: 17/336,047

(22) Filed: Jun. 1, 2021

(65) Prior Publication Data

US 2022/0382760 A1  Dec. 1, 2022

(51) Int. Cl.
*G06F 16/2455* (2019.01)
*G06F 16/18* (2019.01)
*G06F 16/22* (2019.01)
*G06F 16/23* (2019.01)
*G06F 16/25* (2019.01)

(52) U.S. Cl.
CPC .... *G06F 16/24561* (2019.01); *G06F 16/1805* (2019.01); *G06F 16/2246* (2019.01); *G06F 16/2322* (2019.01); *G06F 16/256* (2019.01)

(58) Field of Classification Search
CPC .......... G06F 16/24561; G06F 16/2246; G06F 16/256; G06F 16/2322; G06F 16/1805
USPC ........................................................ 707/609
See application file for complete search history.

(56) References Cited

U.S. PATENT DOCUMENTS

| | | |
|---|---|---|
| 7,424,499 B2 | 9/2008 | Lomet |
| 8,612,382 B1 * | 12/2013 | Patel ................... G06F 11/0793 707/639 |
| 8,620,884 B2 | 12/2013 | Calder et al. |
| 8,768,977 B2 | 7/2014 | Golab et al. |
| 9,176,871 B1 | 11/2015 | Serlet |

(Continued)

OTHER PUBLICATIONS

Office Action for U.S. Appl. No. 17/335,728, mailed on Oct. 5, 2022, Lu, "Fast Recovery and Replication of Key-Value Stores", 12 pages.

(Continued)

*Primary Examiner* — Giovanna B Colan
(74) *Attorney, Agent, or Firm* — Lee & Hayes, P.C.

(57) ABSTRACT

A key-value store is provided, implementing multiple-tiered sorted data structures in memory and storage, including concurrent write buffers in memory, and page-level consolidation of updates on storage, where pages are trivially translated in physical-to-virtual address mapping. The key-value store is built on an indexed sorted data structure on storage, occupying much less storage space and incurring much less disk activity in consolidating updates than a conventional log-structured merge tree organized into files. Concurrent write buffers operate concurrently and independently so that data is committed from memory to storage in an efficient manner, while maintaining chronological sequence of delta pages. Trivial mapping allows mappings of a number of physical pages to be omitted, enabling page mapping tables to occupy less storage space, and simplifying processing workload of read operation retrievals from storage.

20 Claims, 11 Drawing Sheets

(56) References Cited

U.S. PATENT DOCUMENTS

| | | |
|---|---|---|
| 9,400,816 B1 | 7/2016 | Gubarev |
| 9,424,070 B2 | 8/2016 | Hutton et al. |
| 9,438,426 B2 | 9/2016 | Li et al. |
| 9,483,516 B2 | 11/2016 | Lee et al. |
| 9,684,682 B2 | 6/2017 | Mukherjee et al. |
| 9,785,510 B1* | 10/2017 | Madhavarapu ......... G06F 3/065 |
| 9,811,546 B1* | 11/2017 | Bent ................... G06F 16/2228 |
| 10,078,453 B1* | 9/2018 | Li ........................ G06F 16/1847 |
| 10,127,260 B2 | 11/2018 | Goel et al. |
| 10,146,793 B2* | 12/2018 | Srivas ................... G06F 16/275 |
| 10,289,340 B2 | 5/2019 | O'Krafka et al. |
| 10,331,797 B2 | 6/2019 | Chang et al. |
| 10,359,966 B2* | 7/2019 | Guerra Delgado ... G06F 3/0641 |
| 10,474,656 B1* | 11/2019 | Bronnikov ............ G06F 16/217 |
| 10,482,103 B2 | 11/2019 | Lee et al. |
| 10,489,406 B2 | 11/2019 | Toillion et al. |
| 10,496,283 B2 | 12/2019 | Waghulde |
| 10,552,402 B2* | 2/2020 | Eluri ................... G06F 16/2228 |
| 10,585,876 B2 | 3/2020 | Brodt et al. |
| 10,592,411 B2* | 3/2020 | Agarwal ................ G06F 3/065 |
| 10,666,703 B2 | 5/2020 | Padurolu et al. |
| 10,706,105 B2 | 7/2020 | Boles et al. |
| 10,706,106 B2 | 7/2020 | Boles et al. |
| 10,719,562 B2 | 7/2020 | Gupta et al. |
| 10,725,988 B2 | 7/2020 | Boles et al. |
| 10,795,871 B2 | 10/2020 | Velayudhan Pillai et al. |
| 10,956,071 B2 | 3/2021 | Subbarao |
| 10,984,018 B2 | 4/2021 | Shoolman et al. |
| 10,996,884 B2 | 5/2021 | Danilov et al. |
| 11,003,689 B2 | 5/2021 | Lee et al. |
| 11,023,457 B1 | 6/2021 | Maretic |
| 11,093,149 B2 | 8/2021 | Gole et al. |
| 11,100,071 B2 | 8/2021 | Tomlinson et al. |
| 11,188,241 B2 | 11/2021 | Schreter |
| 11,429,587 B1* | 8/2022 | Barrell ................... G06F 16/215 |
| 2004/0024729 A1* | 2/2004 | Worley ................... G06F 12/10 |
| 2006/0219772 A1 | 10/2006 | Bernstein et al. |
| 2009/0119295 A1 | 5/2009 | Chou et al. |
| 2010/0106695 A1 | 4/2010 | Calder et al. |
| 2011/0307447 A1* | 12/2011 | Sabaa ................... H04L 67/568 |
| | | 707/693 |
| 2012/0159098 A1* | 6/2012 | Cheung ............... G06F 12/0261 |
| | | 711/170 |
| 2014/0095810 A1* | 4/2014 | Loewenstein ......... G06F 13/102 |
| | | 711/148 |
| 2016/0179865 A1 | 6/2016 | Bortnikov et al. |
| 2017/0011062 A1* | 1/2017 | Zaveri ................ G06F 16/2379 |
| 2017/0109394 A1 | 4/2017 | Chang |
| 2017/0177284 A1 | 6/2017 | Maesono |
| 2017/0220617 A1 | 8/2017 | Bortnikov et al. |
| 2017/0242785 A1* | 8/2017 | O'Krafka ................ G06F 3/065 |
| 2017/0277726 A1 | 9/2017 | Huang et al. |
| 2018/0300350 A1 | 10/2018 | Mainali et al. |
| 2019/0236059 A1 | 8/2019 | Reddy et al. |
| 2019/0266100 A1 | 8/2019 | Mello et al. |
| 2019/0272254 A1 | 9/2019 | Srivas et al. |
| 2019/0278783 A1 | 9/2019 | Lipcon |
| 2019/0340277 A1 | 11/2019 | Thomsen |
| 2019/0370170 A1 | 12/2019 | Oltean et al. |
| 2020/0042533 A1 | 2/2020 | Lee et al. |
| 2020/0042617 A1* | 2/2020 | Kuang ................ G06F 16/2246 |
| 2020/0257669 A1 | 8/2020 | Boles et al. |
| 2020/0301900 A1* | 9/2020 | Draperi ............... G06F 16/2255 |
| 2021/0042286 A1 | 2/2021 | Kimura |
| 2021/0097036 A1 | 4/2021 | Wetterau et al. |
| 2021/0103397 A1* | 4/2021 | George ................. G06F 3/0641 |
| 2021/0224236 A1* | 7/2021 | Wang ................. G06F 16/2272 |
| 2021/0311880 A1* | 10/2021 | Gupta ................. G06F 11/1451 |
| 2022/0318227 A1 | 10/2022 | Le |
| 2022/0335027 A1* | 10/2022 | Subramanian Seshadri ................ |
| | | G06F 16/24573 |
| 2022/0382651 A1 | 12/2022 | Lu |
| 2022/0382674 A1 | 12/2022 | Wang |
| 2022/0382734 A1 | 12/2022 | Peng |
| 2023/0046216 A1 | 2/2023 | Daga et al. |

OTHER PUBLICATIONS

Office Action for U.S. Appl. No. 17/336,141, mailed on Oct. 18, 2022, Wang, "Granularly Timestamped Concurrency Control for Key-Value Store", 12 Pages.

Kazmi, "Sort Duplicate Files According to Size and Delete Them", Mar. 2019, 5 pgs.

Office Action for U.S. Appl. No. 17/335,853, mailed on Jun. 5, 2023, "Garbage Collection of Tree Structure With Page Mappings", 18 pages.

Pang, et al., "ArkDB: A Key-Value Engine for Scalable Cloud Storage Services", Jun. 2021, 14 pgs.

* cited by examiner

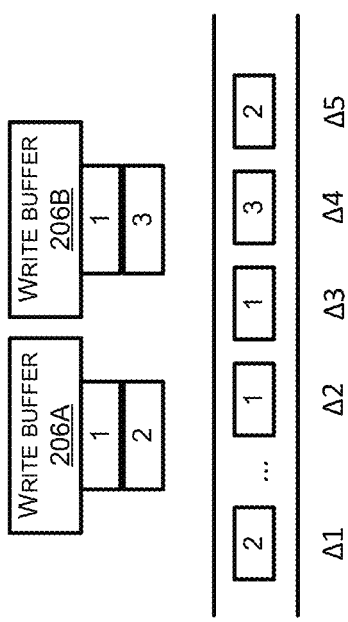
FIG. 3A
FIG. 3B
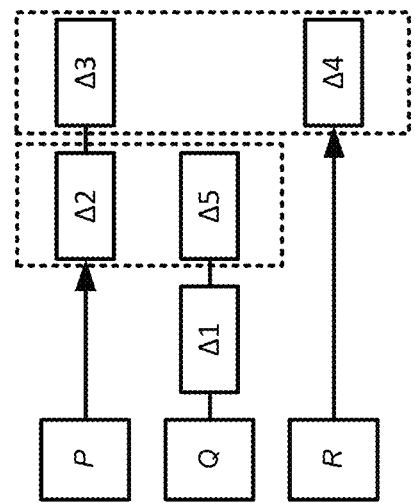
FIG. 3C

HIGH-PERFORMANCE KEY-VALUE STORE

BACKGROUND

As businesses in many industries become increasingly data-driven, there is a constant need for high-performance database designs, optimized for storage and retrieval of massive volumes of data, based on various data schemas and various hardware architectures. One example of database design is a key-value ("KV") store, based on a data schema storing records containing various data fields, keys that uniquely identify each record, and associations between keys and records. Keys may be mapped to records by various implementations, such as hash tables, dictionaries, and the like.

KV stores may implement read and write operations based on a log-structured merge ("LSM") tree data structure. Such database designs are generally optimized to support applications, services, and such computer-hosted functionality incurring high-volume write operations. LSM trees are implemented partially in memory and partially on storage of a computing system. In LSM-based KV stores, write transactions may be recorded in memory at first, and then may be compacted and stored on storage of the computing system. In this fashion, the design of LSM-based KV stores seeks to improve write performance of computing systems, while incurring subsequent workloads in compacting write transactions to storage. Such a tradeoff is thought to be particularly desirable for computing systems implementing storage using solid-state drives ("SSDs").

In practice, compaction workloads result in substantial performance degradation in deployed LSM-based KV stores. After a KV store logs a substantial number of write transactions for a computing system, storage devices of the computing system must perform a large compaction transaction, resulting in interference between write transactions and compaction transactions. Thus, implementations of LSM-based KV stores tend to trade alleviation of up front write workloads for exacerbation of subsequent compaction workloads. There is a need to further engineer such KV stores to retain their design advantages, while minimizing their disadvantages.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A through 3D illustrate checkpoint operations of concurrent write buffers according to example embodiments of the present disclosure.

DETAILED DESCRIPTION

Systems and methods discussed herein are directed to implementing data stores, and more specifically implementing a key-value data store based on multiple-tiered sorted data structures in memory and storage. The key-value data store implements concurrent write buffers, trivially translated physical-to-virtual address mapping, and page-level consolidation of updates. Each of these features of the key-value data store alleviates may alleviate transactional workload on storage devices of a computing system, particularly that arising from blocking between same, or different, types of write transactions, such as append transactions and consolidating transactions.

Figure 1:
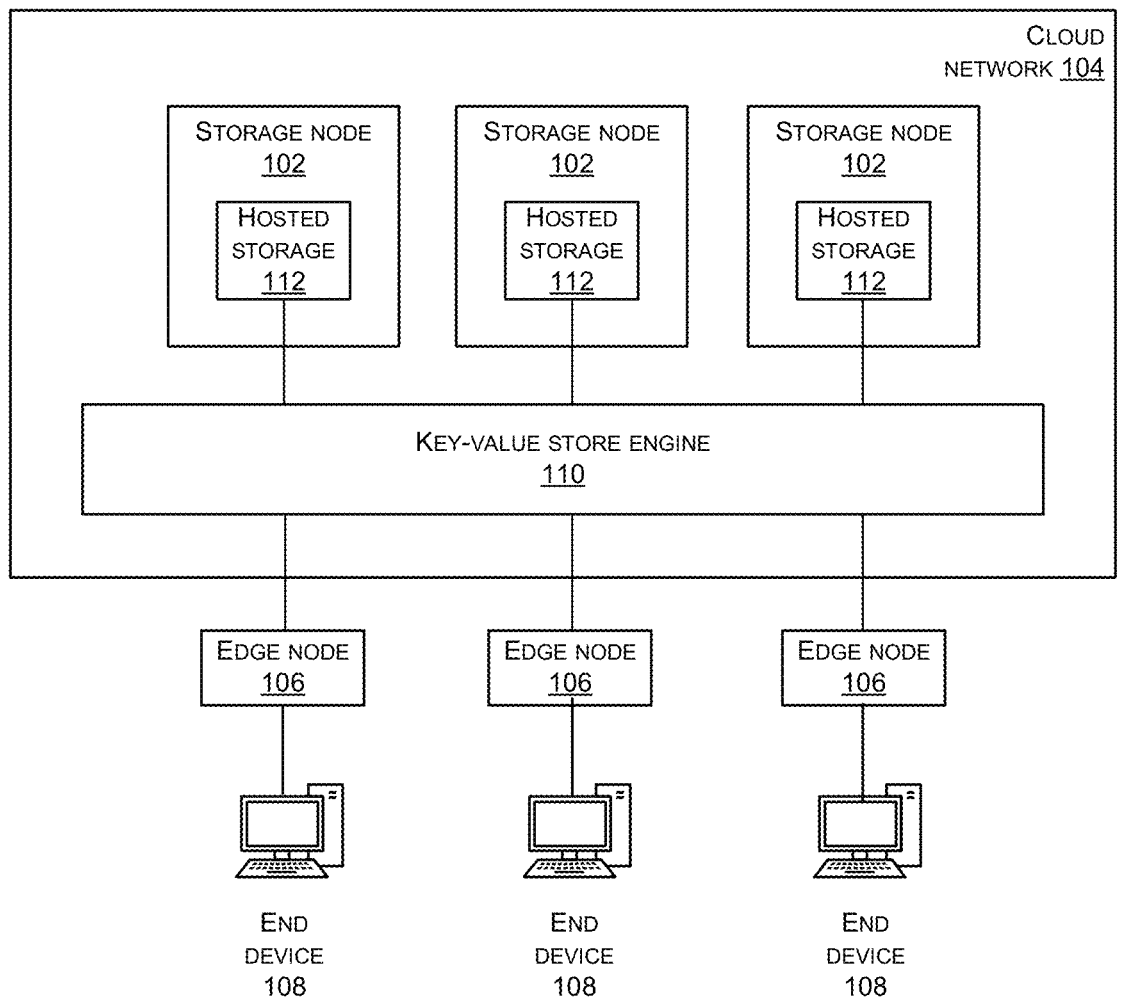
FIG. 1 illustrates an architectural diagram of a storage system according to example embodiments of the present disclosure.

FIG. 1 illustrates an architectural diagram of a storage system 100 according to example embodiments of the present disclosure. The storage system 100 may be an individual computing system or a cloud storage system, which may provide collections of servers hosting storage resources to provide distributed storage, improved availability of physical or virtual storage resources, and such benefits.

The storage system 100 may be implemented over any number of physical or virtual storage hosts (where any unspecified storage host may be referred to as a storage node 102), where multiple such storage nodes 102 may be connected by physical or virtual network connections. Though the storage system 100 may be implemented over as few as one storage node 102, by way of example, FIG. 1 illustrates that any number of storage nodes 102 may collectively be interconnected in a cloud network 104. Such a cloud network 104 may terminate at physical or virtual edge nodes (where any unspecified edge node may be referred to as an edge node 106) located at physical and/or logical edges of the cloud network 104. The edge nodes 106 may connect to any number of end devices (where any unspecified end device may be referred to as an end device 108).

A key-value ("KV") store engine 110 may be implemented on the storage system 100. The KV store engine 110 may be configured to receive and process file operations according to a file system communication protocol (such as a network file system communication protocol), a data query protocol, and the like, which implements one or more application programming interfaces ("APIs") providing file operation calls. File system communication protocols as described herein may implement APIs suitable to express a file operation having various parameters, such as Portable Operating System Interface ("POSIX"). Furthermore, in example embodiments wherein the storage system 100 is implemented over a cloud network 104, file system communication protocols as described herein may implement APIs suitable to communicate with any number of end devices 108 by a network connection to enable end devices 108 to express a file operation having various parameters, such as Filesystem in Userspace ("FUSE"), Network File System ("NFS"), Representational State Transfer ("REST") APIs, and the like.

It is known to persons skilled in the art to mitigate access load at a storage system 100 by partitioning data stored at hosted storage 112 of a storage system 100, and furthermore by replicating any partition into multiple data replicas, so that read transactions and write transactions to the same data may potentially be serviced by separate read replicas and write replicas of a same partition. Moreover, it is desired to maintain multiple read replicas of the same partition, so that read operations can be performed at arbitrarily large scales. Additionally, upon failure of a write replica, it is desired to promptly perform system recovery by promoting a read replica as a new write replica.

Partitions according to example embodiments of the present disclosure may be merged by the KV store engine implementing hard-linking amongst extents (as shall be described subsequently), so that the KV store engine may merge partitions by concatenating pages of extents at boundaries of partitions, and may split partitions by cutting pages spanning a new boundary to be created.

Data queries according to example embodiments of the present disclosure may include, for example, point lookup queries and range queries. Herein, point lookup queries refer to data queries which cause a KV store to return one record, or to return a small number of distinct records not based on a range of values in those records. Range queries refer to data queries which cause a KV store to return any number of records having values falling within a particular range. Unlike point lookup queries, range queries do not specify a number of records to be returned as a parameter.

Moreover, data queries according to example embodiments of the present disclosure may include snapshot queries. For example, both point lookup queries and range queries may be snapshot queries. Herein, snapshot queries refer to data queries which cause a KV store to return any number of records (without limitation as to number of records returned) such that, for each data query made at a query time, a state in time of the returned record(s) is consistent with the query time.

In either case, the KV store engine 110 is configured to receive, from the storage system 100 and components thereof and/or from any number of end devices 108 by a communication protocol, file and/or data operation calls on persistent storage, which may include one or more of each type of operation conceptualized as "CRUD" in the art: one or more create operation(s), one or more read operation(s), one or more update operation(s), and one or more delete operation(s), each acting upon files and/or data on persistent storage, without limitation thereto. For brevity, the set of such operations implemented by the KV store engine 110 may be referred to as "persistent storage transactions."

In other words, before the query time, the returned record(s) may have a prior state in a prior time, and after the query time, the returned record(s) may have a subsequent state in a subsequent time, and both the prior state in the prior time and a subsequent state in the subsequent time may be inconsistent with the query time. For example, it should be understood that between the prior time and the query time, a write operation may have changed at least one of the returned record(s), causing inconsistency between these two times, and between the query time and the subsequent time, a write operation may have changed at least one of the returned record(s), causing inconsistency between these two times. It should further be understood that such write operations may or may not necessarily have occurred between these times; regardless, consistency between the state in time of the returned record(s) and the query time prevents the returned data from being corrupted by such inconsistencies.

It should be understood that the KV store engine 110 may be configured to preserve, for each record of the KV store, multiple states in time of that record, each at distinct times. In this fashion, regardless of whether a record has been written to, the KV store engine 110 may return respective states of the record at multiple distinct times. The KV store engine 110 may implement preservation of multiple such states in time as snapshots, in accordance with snapshot isolation techniques as known to persons skilled in the art.

According to snapshot isolation techniques as known in the art, a KV store engine 110 may be configured to preserve any number of snapshots of a data record over time, at a time. Multiple snapshots of a data record may therefore be ordered by time relative to each other. Such an ordering by time relationship, for the purpose of understanding example embodiments of the present disclosure, may be subsequently referred to as generational ordering. It should further be understood that according to snapshot isolation techniques as known in the art, a KV store engine 110 may be configured to discard oldest-generation snapshots upon creating newest-generation snapshots, so that the number of generations of snapshots preserved at a time does not grow indefinitely, and so that storage space occupied by snapshots does not expand indefinitely. Techniques for preserving a finite number of generations of snapshots are known to persons skilled in the art, and need not be further elaborated herein for understanding example embodiments of the present disclosure.

According to snapshot isolation techniques as known in the art, snapshot isolation may be implemented according to multi-version concurrency control ("MVCC"), wherein an additional generational data field (such as a column, in the case of a table-based database) is written in each data record, the generational data field recording a version number, a timestamp, or otherwise some information which orders data records by generation. Thus, a data record, under conventional MVCC techniques, includes not only data in accordance with a schema of a KV store (i.e., a KV store may be constructed to store structured or unstructured data, organized into various fields and relationships therebetween, which may be indexed and sortable in manners as contemplated by maintainers and consumers of the KV store), but furthermore is expanded to include a generational index field which places a snapshot of the data record in generational ordering among other snapshots of the same data record.

Thus, according to snapshot isolation techniques as known in the art, leveraging such an index field, the KV store engine 110 may establish a singular index of snapshot times for each data record; for every transaction pertaining to that data record, therefore, the KV store engine 110 may determine a transaction time, then look up the transaction time in the singular index of snapshot times for the data record to retrieve a snapshot corresponding to the transaction time.

However, in large-scaled data storage systems, the addition of a generational index field to all data records of a KV store greatly compounds storage space consumed by data which does not contribute to the schema of the KV store as constructed. In this regard, generational index fields may subsequently be described as "extra-schema data" in the present disclosure, for brevity. Therefore, according to example embodiments of the present disclosure, as shall be subsequently described, a KV store engine 110 implements snapshot isolation without adding generational index fields to data records.

Further details of snapshot query support according to example embodiments of the present disclosure shall be subsequently described throughout the present disclosure.

The KV store engine 110 may be further configured to execute persistent storage transactions by performing file and/or data operations on collective hosted storage 112 of any number of storage node(s) 102 of the storage system 100. File and/or data operations may include logical file or data operations such as creating files and/or data store entries, deleting files and/or data store entries, reading from files and/or data store entries, writing to files and/or data store entries, renaming files and/or data store entries, moving a file and/or data store entry from one location to another location, and the like, as supported by a file system configured on the hosted storage 112. The KV store engine 110 may perform all file system and/or data store management system functions required to support such operations, and furthermore may be configured to perform such file operations by making calls to storage device drivers, or may be configured to perform such file operations by making calls to hardware-specific interfaces in place of storage device drivers.

A file system configured on the hosted storage 112 may address files and/or data stored on the hosted storage 112 according to extents. According to a file system, data may be stored as logical blocks of a predetermined size, mapped to corresponding physical addresses on storage. An extent, as known to persons skilled in the art, may indicate a range of contiguous blocks on storage; within an extent, individual blocks are further specified as offsets of the extent. Thus, a file system configured on the hosted storage 112 according to example embodiments of the present disclosure may utilize extent-offset addressing to provide virtual addresses mapped to physical locations of each block on the storage. Example embodiments of the present disclosure may incorporate any among various file systems configured to utilize extent-offset addressing as known to persons skilled in the art, such as XFS, ext4, and the like. Upon an extent being written to full capacity, the file system marks the extent as sealed; the file system can no longer write to an extent which is sealed.

Hosted storage 112 may be hosted at storage node(s) 102 of the storage system 100. Storage devices may be implemented as non-volatile storage media, particularly as flash memory such as solid state drives ("SSDs"), which may exhibit certain advantages and disadvantages. For example, while implementations of flash memory may permit fast random-access reads of data, random-access writes of data may exhibit greater latency compare to memory, especially with respect to operations such as inserts and deletes in indexed data structures. While memory random-access is byte-addressable, persistent memory implementations based on flash memory may only be able to write data upon erasing data blocks of fixed size, resulting in the phenomenon of write amplification as known in the art, quantified by amount of storage write activity relative to quantity of data written. In particular, high write amplification may be caused by write accesses of size smaller than the access granularity of the underlying flash memory, leading to a cascade of moving and rewriting operations which substantially increase write latency. This phenomenon may be particularly exacerbated in the case of random access, such as inserts, deletes, and the like.

Hosted storage 112 may be implemented as physical and/or virtual storage devices implementing read and write operations, data structures, storage device layout, and the like. Collectively, hosted storage 112 across networked storage nodes 102 of the storage system 100 may be referred to as "cloud storage," and any number of such storage devices may be virtualized as one storage device for the purpose of executing persistent storage transactions from one or more end devices 108.

Hosted storage 112 may include various forms of computer-readable storage media, which may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

It should be understood that storage devices may be implemented to permit write operations according to different data structures, disk layouts, and logic. For example, storage devices may be implemented to store sequential data structures which permit write operations in an append-only fashion, though such data structures may ultimately be erased to reclaim space. Alternatively, storage devices may be implemented to store data structures which are mutable at any time, such as tracks and sectors on a magnetic disk. In any case, block-based basic data structures may be written to the storage device, and it should be understood that magnetic disks, though conventionally implementing freely mutable data structures, may also implement sequential data structures which are written to in an append-only fashion. According to example embodiments of the present disclosure, hosted storage 112 may at least include some number of physical and/or virtual storage devices implemented at least in part using flash memory, such as solid-state drives ("SSDs"). However, hosted storage 112 may include any combination of magnetic disks, flash memory, and the like, on which write operations are implemented to write to sequential data structures in an append-only manner. Example embodiments of the present disclosure as described below may be understood as implemented and proceeding substantially similarly regardless of the nature of the underlying storage devices.

The KV store engine 110 may configure hosted storage 112 collectively making up storage of the storage system 100 to store files and/or data store entries, as described above, in some number of basic data structures, which further store metadata describing layout and locations of each stored file and/or data store entry. Such metadata may configure a KV store engine 110 to map a logical file and/or data entry, as specified by an end device 108, to each location where data of that logical file and/or data entry is stored across cloud storage on one or more devices of hosted storage 112. Details of such mapping shall be subsequently elaborated upon.

Data stored at hosted storage 112 may be logically organized into files. In the context of a KV store according to example embodiments of the present disclosure, a file may refer to a logical collection of a large, arbitrary number of records sorted by one or more indices. For example, indices may be keys mapped to each record, such that all records of a file are sorted by respective corresponding keys. According to example embodiments of the present disclosure, a file may reside in memory or on storage of a storage host. A file may be mutable while residing in memory, and may be immutable while residing on storage. For example, a file according to example embodiments of the present disclosure may be a sorted string table ("SSTable"). Files may be generally substantially large in size, commonly ranging from hundreds of megabytes ("MB") to gigabytes ("GB") in size.

In the context of a KV store based on a log-structured merge ("LSM") tree according to example embodiments of the present disclosure, files implemented as described above may be further organized into multiple levels of the LSM tree. Levels may be conceptually organized into higher and lower levels, where a topmost level stores in-memory files newly inserted into a write buffer of the KV store (as shall be described subsequently), and each lower level stores files written to storage of a storage host. Each lower level may store records sorted on a per-level basis, such that all records of files of a same level are sorted across all files of the same level, with each file encompassing a sub-range of the entire range of the level.

Each level may have a target level size defined in bytes, where the KV store is configured to perform consolidation (as shall be described subsequently) to maintain files collectively organized in each level at a total level size approximately less than or equal to the target level size.

Furthermore, each lower level may have a target level size which is an order of magnitude larger than that of the preceding higher level. For example, a first lower level may have a target level size of 300 MB; a second lower level below the first may have a target level size of 3 GB; a third lower level below the second may have a target level size of 30 GB; a fourth lower level below the third may have a target level size of 300 GB; and so on.

Conventional KV stores based on a LSM tree are implemented by examples known to persons skilled in the art, such as RocksDB. RocksDB implements level compaction, an algorithm triggered by files inserted into a highest level of the LSM tree having a total level size exceeding a target level size of the highest level of the LSM tree. Such a condition trigger causes files of the highest level of the LSM tree to be flushed from in-memory write buffers and merged down into a next lower level; total level size of a next lower level may then exceed its own target level size, triggering a further merge-down, and such merge-downs may proceed until reaching a lowest level of the LSM tree.

During the merge-down process, each file from a higher level may be merged into at least one file of a lower level, where the higher-level file and the at least one lower-level file have mutually overlapping sub-ranges. Such a sorted merge may be implemented in accordance with merge sort algorithms as known to persons skilled in the art for implementing LSM trees.

However, such conventional implementations of KV stores based on a LSM tree perform compaction at file granularity, rather than sub-file granularities. Since files may be hundreds of megabytes or many gigabytes in size, compaction operations may incur substantial storage read and write activity. KV stores based on a LSM tree may be implemented on computing systems wherein storage is implemented using solid-state drives ("SSDs"); such compaction operations are generally thought to alleviate write amplification as described above, to some extent. However, some extent of write amplification remains according to such implementations. Furthermore, for such KV stores, blocking occurs between concurrent file and/or data operations, such as concurrent write operations and compaction operations. Routine, small write operations are likely to be blocked for prolonged periods of time by less frequent but substantially larger compaction operations. Moreover, due to the logic of compaction operations driving cascades of merge-downs over multiple levels of a LSM tree, compaction operations, when they occur, tend to cause spikes of write activity which further compound the above-described blocking.

Additionally, analogous to write amplification, the term "read amplification," particularly in the context of KV stores based on a LSM tree, is quantified by amount of storage read activity relative to quantity of data read. In particular, high read amplification may be caused by key-based read queries missing multiple times at multiple levels of a LSM tree before retrieving data to be read. This may result from ongoing compaction operations not yet having merged all files to respective destination levels in time to service the key-based queries, leading to a cascade of queries across multiple LSM tree levels which substantially increase read latency. This phenomenon may be particularly exacerbated in the case of range queries as opposed to point lookup queries, since range queries may inherently result in queries to a number of different files covering different sub-ranges of keys.

Consequently, example embodiments of the present disclosure provide a KV store implementing multiple-tiered sorted data structures in memory and storage, including concurrent write buffers in memory, and page-level consolidation of updates on storage, where pages are trivially translated in physical-to-virtual address mapping. Each of these features may confer performance and functional advantages upon computing systems implementing a KV store according to example embodiments of the present disclosure, as shall be described subsequently.

Figure 2:
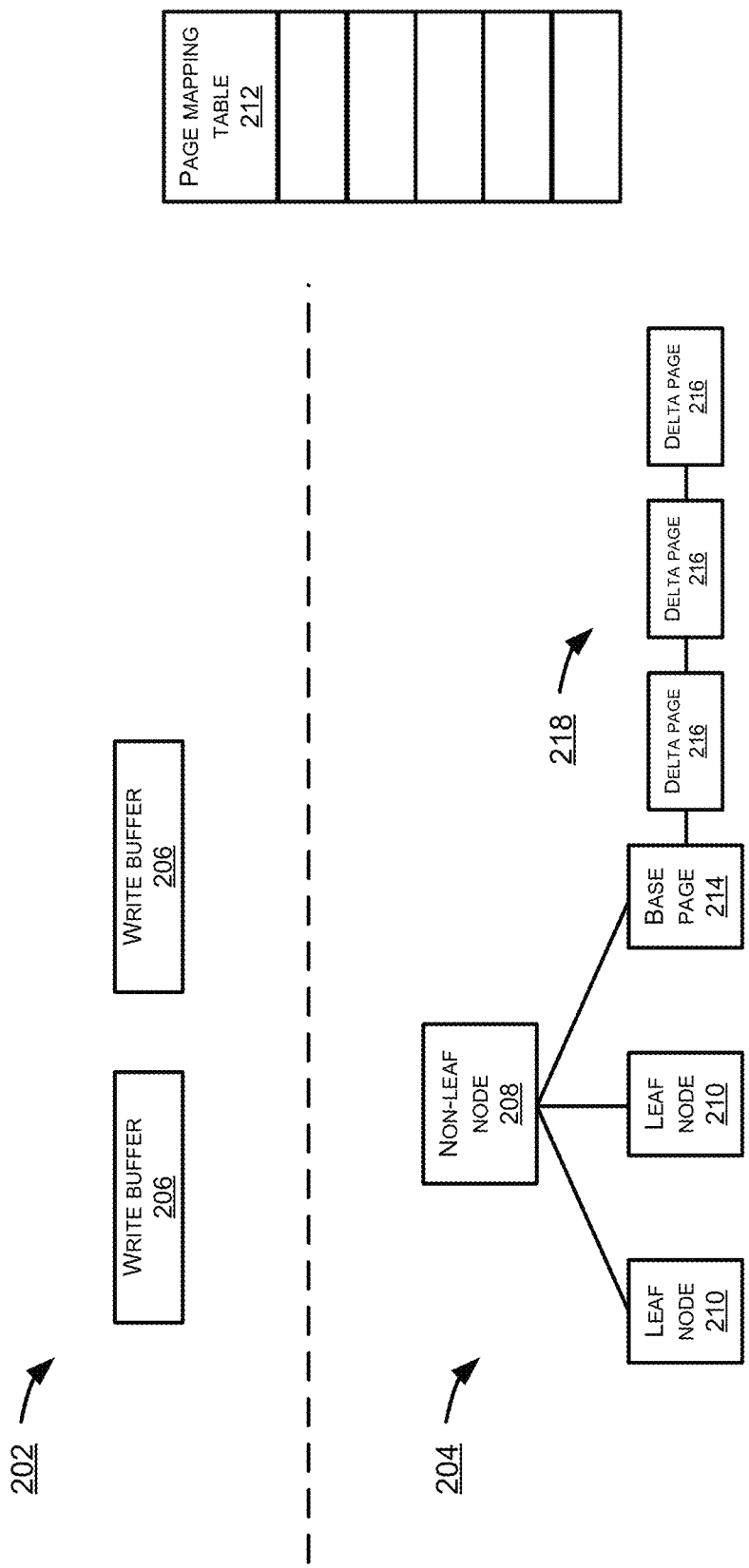
FIG. 2 illustrates multiple-tiered sorted data structures implemented in memory and storage, according to example embodiments of the present disclosure.

FIG. 2 illustrates multiple-tiered sorted data structures implemented in memory and storage, according to example embodiments of the present disclosure. In a computing system, which may be a storage host as described above according to example embodiments of the present disclosure, a sorted data structure 202 is implemented in memory of the computing system, and an indexed sorted data structure 204 is implemented on storage of the computing system. The sorted data structure 202 may include a write buffer 206, each write buffer being implemented as a sorted data structure which receives insertions of elements. Elements of each write buffer should be sorted, and insertions into each write buffer should maintain the respective sorted order of that write buffer. Thus, each write buffer may be implemented as a sorted data structure wherein inserts are guaranteed in sorted order, such as a skip list; a sorted data structure wherein inserts cause the data structure to be rearranged in sorted order, such as a red-black tree; and the like. Moreover, such sorted data structures are generally implemented such that queries and insertions may be performed in logarithmic time, according to algorithms as known to persons skilled in the art.

Each insertion into a write buffer 206 may implement a persistent storage transaction. The KV store engine 110 may be configured to record each such persistent storage transaction in a transaction log in storage of the computing system (not illustrated). Each transaction recorded in a transaction log may, after commitment to storage of the computing system, be implemented by inserting an element into a write buffer as described above.

A first write buffer 206 may continue to accept inserted records until the size of that first write buffer reaches a record count threshold or a memory usage threshold. Thereupon, the KV store engine freezes the first write buffer as immutable and queues the first write buffer to be flushed into the indexed sorted data structure 204 on storage, according to a checkpoint operation as shall be described subsequently.

While the first write buffer is frozen as immutable, the KV store engine creates a second write buffer, which may accept further record insertions. Thus, according to example embodiments of the present disclosure, the KV store engine may ensure that a non-immutable write buffer is always available to accept record insertions.

FIGS. 3A through 3D illustrate checkpoint operations of concurrent write buffers according to example embodiments of the present disclosure. FIG. 3A shows the results of appending contents of two write buffers 206A and 206B into a page stream. Write buffer 206A has received an update to a record keyed 1 and an update to a record keyed 2; write buffer 206B has received an update to the same record keyed 1 and an update to record keyed 3. Each of these updates, upon being checkpointed, may be appended to a second page stream (as shall subsequently be described) as a delta page in the order of its system timestamp.

Thus, it may be seen that following an already appended delta page updating the record keyed 1 at time 1 (notated as delta page A1 henceforth), the updates of write buffer 206A are appended with the update to the record keyed 1 at time 2 (notated as delta page Δ2 henceforth) and the update to the record keyed 2 at time 5 (notated as delta page Δ5 henceforth). However, in between those two delta pages, the updates of write buffer 206B are appended with the update to the record keyed 1 at time 3 (notated as delta page Δ3 henceforth) and the update to the record keyed 3 at time 4 (notated as delta page Δ4 henceforth).

Each page stream may be a sequentially-written data structure, where the KV store engine is configured to insert base pages into the first page stream and insert delta pages into the second page stream. Base pages and delta pages are described in further detail subsequently. The first page stream and the second page stream are both part of the indexed sorted data structure 204.

According to example embodiments of the present disclosure, the KV store engine 110 is configured to generate a system timestamp corresponding to each checkpoint operation. Any persistent storage transaction which causes an update to one or more record(s) will not only query one or more record(s), but will also write to those record(s) in the KV store; therefore, the snapshot read timestamp corresponds to a query time as conceptually described above.

FIG. 3B shows the results of mapping the delta pages of FIG. 3A to PIDs. By traversing the indexed sorted data structure 204 by a search as known to persons skilled in the art, the delta page Δ2 is mapped to a page having PID P, and the delta pages Δ5 is mapped to a page having PID Q; furthermore, the delta page Δ3 is mapped to the same page having PID P, and the delta page Δ4 is mapped to a page having PID R.

FIG. 3C shows the results of appending the delta pages of FIG. 3B to the respectively mapped pages having PIDs P, Q, and R. The delta page Δ1 has also been appended. It should be noted that the delta pages are collected together by broken lines to show relationship in terms of write buffers; the broken lines do not indicate any temporality.

Figure 3E:
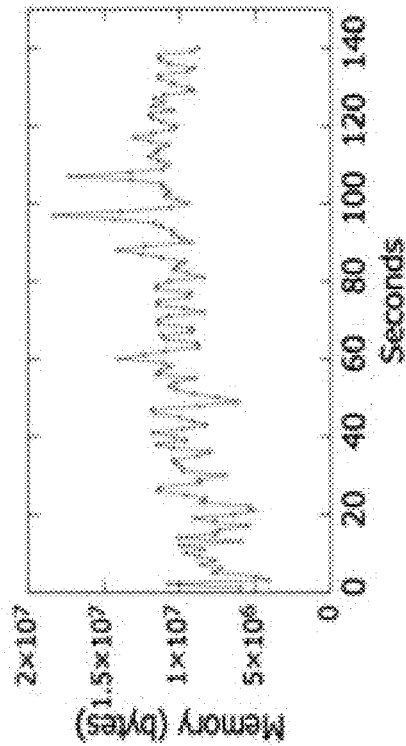
FIG. 3E illustrates experimentally observed memory footprint of a page mapping table according to example embodiments of the present disclosure.
Figure 3D:
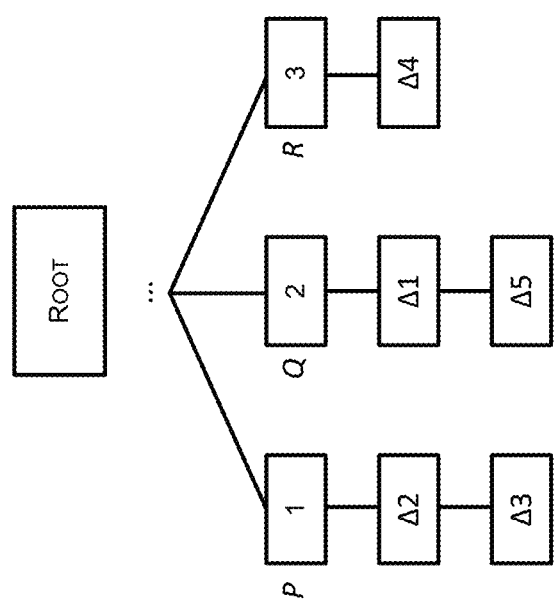

FIG. 3D shows the results of FIG. 3C in the leveled hierarchy of the indexed sorted data structure 204.

In summary, mapping update operations according to example embodiments of the present disclosure, including checkpoint operations, consolidation operations, tree growing operations, tree shrinking operations, and garbage collection operations may each be performed by the KV store engine 110 according to substantially and at least the following steps: the KV store engine 110 generates a system timestamp; the KV store engine 110 inserts base page(s) into the first page stream and/or inserts delta page(s) into the second page stream; and the KV store engine 110 records each update to a page mapping table 212 in a system commit log, and performs each update upon the page mapping table 212. However, it should be understood that, while updates to a mapping table 212 may only be recorded to a system commit log one at a time in serial (and thus updates to the page mapping table 212 may only be performed one at a time in serial), the KV store engine 110 may perform any number of page insertions into the first page stream and/or any number of page insertions into the second page stream concurrently, arising from any number of mapping update operations being performed concurrently. Consequently, the risk of multiple concurrent mapping update operations being performed upon inconsistent data record(s) of the KV store, in the absence of concurrency control, is substantial.

Additionally, it should be understood that, during any number of checkpoint operations, since updates performed concurrently are limited to appends of delta pages, the tree structure of the indexed sorted data structure 204 is not changed; thus, resulting updates to the mapping table 212 may be performed in timestamp order. However, during other mapping update operations, the tree structure of the indexed sorted data structure may be modified; thus, further details of serially updating a page mapping table 212 according to example embodiments of the present disclosure shall be subsequently described with reference to consolidation operations.

It should be understood that, initially, an indexed sorted data structure 204 is empty before any inserted records have been flushed to storage. In such cases, the KV store engine performs an initial checkpoint operation by creating the indexed sorted data structure 204 based on the delta pages checkpointed from one write buffer, and no other checkpoint operations are performed for any other write buffers until the indexed sorted data structure 204 is created. The indexed sorted data structure 204 may be created by any algorithm suitable to build a leveled data structure indexed and sorted by keys, as known to persons skilled in the art.

An advantage of concurrent write buffers as described herein is that each separate write buffer operates concurrently, independent of each other write buffer; checkpoint operations are also performed for each write buffer independent of each other write buffer, so that data is committed from memory to storage in an efficient manner. Furthermore, insertions in each write buffer is checkpointed in mutually chronological order, so that chronological sequence of delta pages is maintained.

According to example embodiments of the present disclosure, a KV store engine may be configured to perform a key-based query starting at the sorted data structure 202, to determine whether there is a key hit at any of the records written to memory and not yet flushed to storage. In the event that the key-based query misses at the sorted data structure 202, the KV store engine then performs the key-based query in storage at the indexed sorted data structure 204, as shall be described subsequently.

The indexed sorted data structure 204 may organize data stored at the computing system. Data stored at the indexed sorted data structure 204 may be logically organized into pages. Such pages may be organized into a tree structure, wherein a page may make up each non-leaf node 208 of the tree structure and each leaf node 210 of the tree structure. In the context of a KV store according to example embodiments of the present disclosure, a page may constitute a collection of keys, such that each key at a non-leaf node points to another page (which may be a non-leaf node or a leaf node), and each key at a leaf node is mapped to a record stored elsewhere on storage, not within the indexed sorted data structure 204. As keys do not contain record data, each page may be fixed in size and may be a few kilobytes in size. Consequently, the indexed sorted data structure 204, being organized into pages rather than files, occupies much less storage space than a LSM tree organized into files as described above.

According to example embodiments of the present disclosure, the tree structure as described above may be further organized into multiple levels. Levels may be conceptually organized into higher and lower levels, where only pages at a bottommost level (i.e., leaf nodes of the tree structure) include keys mapped to records.

Moreover, each page of the indexed sorted data structure 204 may be a virtual page, constituting a logical page identifier ("PID"), which is further mapped to a physical page address residing on storage. Each key at a non-leaf node may point to another page by a PID of that page, but may not point to another page by a physical page address. The indexed sorted data structure 204 may record such a mapping between a PID and a physical page address in a page mapping table 212, the page mapping table 212 also being part of the indexed sorted data structure 204. According to example embodiments of the present disclosure, physical page addresses and PIDs may both be specified in extent-offset format as described above.

According to example embodiments of the present disclosure, a KV store engine may implement trivial translation at a page mapping table, which shall be defined henceforth. According to trivial translation as defined herein, a KV store engine, upon initially establishing a mapping from a physical page address to a PID, may designate the PID as the same extent-offset address as the physical page address. Such a translation is called "trivial" herein because it does not translate one extent-offset address (i.e., a physical address) to another extent-offset address (i.e., a logical address). Such trivial translations are not recorded in a page mapping table; only translatory mappings, wherein one extent-offset address is translated to another, are recorded. According to example embodiments of the present disclosure, it is expected that trivial translations reflect newly written pages which have not yet been updated, while updates to pages (subsequently described with reference to "delta pages") modify PIDs of pages, causing trivial translations to be replaced by translatory mappings.

It should be understood that conventional indexed sorted data structures as known to persons skilled in the art, such as B+ trees, may record each mapping between a PID and a physical page address in a conventional page mapping table. Consequently, such conventional page mapping tables are proportional in size to the size of a corresponding data structure such as a B+ tree. The size of the page mapping table therefore has a proportional floor tied to the size of the corresponding data structure, and cannot be reduced below this logical floor.

In contrast, a page mapping table 212 according to example embodiments of the present disclosure does not have a size floor, and may be arbitrarily small in size, since any number of mappings of the indexed sorted data structure 204 may be trivial translations, and thus not initially recorded in the page mapping table 212.

The indexed sorted data structure 204 may be updated in an append-only fashion, by receiving writes on a sequential, append-only basis. For each page of the indexed sorted data structure 204, updates directed to that page may be appended to that page (subsequently referred to as a "base page," in the context of updates to the base page), as a page describing updates to the base page 214 (subsequently referred to as a "delta page," in the context of updates to the base page). Each subsequent delta page 216 appended to a same base page is appended into a same chain (subsequently referred to as a "delta chain").

The physical page address of the base page 214 may be trivially translated to a PID, and the KV store may map the trivially translated PID to the physical page address, then establish a delta chain 218 for the PID of the base page 214; thus, each delta page 216 appended to the same base page 214 is also applied to the same PID of the base page 214.

According to example embodiments of the present disclosure, each update to a base page may be written to the first page stream, as described above. Each delta page written to a first page stream has a physical page address, but physical page addresses of delta pages are not further mapped to additional PIDs.

For each base page 214 or delta page 216 in a delta chain 218, a mapping from a physical address to a PID of the base page or delta page may be recorded in a mapping data structure including at least the following elements: a system timestamp (as shall be described subsequently); a pointer to a next page of the same delta chain; a retiring chain pointer to a side delta chain of delta pages (so that after a consolidation of delta pages, the pre-consolidation delta pages remain active for ongoing, unfinished read operations, as shall be described subsequently with reference to side-chaining operations); a physical page address to which a PID of the base page or delta page is mapped; and a union structure operative to configure a bloom filter of the indexed sorted data structure 204. For a base page 214, the union structure may be a pointer to a bloom filter of the base page in its parent page in the indexed sorted data structure 204; for a delta page 216, the union structure may be a union of 8-byte hashes of all keys of the delta page 216.

It is generally known to persons skilled in the art that a bloom filter may be implemented over a KV store to determine that certain keys are definitely not present at one or more data structures of the KV store, thus reducing the number of key-based query misses, and in turn reducing read amplification due to fewer number of unnecessary read operations performed at hosted storage. Implementation of a bloom filter with regard to the indexed sorted data structure 204 is described in further detail subsequently.

Upon a key-based query missing at the sorted data structure 202, the KV store engine then performs the key-based query in storage at the indexed sorted data structure 204. In the event that the key-based query is a point lookup query, the KV store engine may input the key into the bloom filter, and then only perform a key-based search of the indexed sorted data structure 204 in the event that the bloom filter does not return a negative output. In the event that the key-based query is a range query, the KV store engine may search the indexed sorted data structure 204 by traversing keys of each page therein and their respective delta chains 218, the traversal process being described subsequently.

It should be understood that the KV store engine may search an indexed sorted data structure 204 by any search algorithm suitable for an indexed sorted data structure as known to persons skilled in the art. Furthermore, during this search, in order to retrieve queried data from storage, the KV store engine translates each PID of a page by performing a mapping retrieval operation. The KV store engine looks up each PID in the page mapping table 212; each PID not found in the page mapping table 212 may be deemed a trivial translation, and thus the KV store engine may directly access a physical page address on storage that is the same extent-offset address as the PID. However, each PID found in the page mapping table indicates that the page has been updated, and thus the KV store engine must further traverse a delta chain of the page to retrieve all updates to the page. In the event that a read timestamp of the read operation is later than a system timestamp of a head of a delta chain of the page (reflecting the latest system timestamp of the delta chain), the KV store engine may traverse the delta chain to retrieve delta pages. However, in the event that a read timestamp of the read operation is earlier than a system timestamp of the head of the delta chain of the page, the KV store engine must traverse a side delta chain as described above to retrieve pre-consolidation delta pages.

The above describes an advantage of trivial translation implemented in a page mapping table: the page mapping table does not record every mapping of a PID to a physical page address. Trivial translations allow mappings of a number of physical pages to be omitted, enabling page mapping tables to be arbitrarily small in size without a size floor, and simplifying processing workload of read operation retrievals from storage.

FIG. 3E illustrates experimentally observed memory footprint of a page mapping table according to example embodiments of the present disclosure (technical specifications of an experimental computing system are described subsequently with reference to FIG. 8). A KV store engine according to example embodiments of the present disclosure ingested 100 million uniformly distributed key-values on a prepopulated B+ tree with 100 million key-values. The KV store engine was configured with a delta chain threshold for page consolidation at 4. FIG. 3E illustrates that memory usage of the KV store engine on the experimental system, after an initial climb, enters a steadily state fluctuating around 10 MB.

The above observations can be explained by the count of pages having mapping entries remaining around 165,000, while the total page count ultimately reached 512,000. This demonstrates that the page mapping table according to example embodiments of the present disclosure does not scale in size proportional to the size of an indexed sorted data structure, and thus storage occupied by the page mapping table can be arbitrarily small, improving storage efficiency.

As referenced above, upon a delta page 216 being appended into the delta chain 218, a system timestamp of the delta page 216 may be written into a mapping data structure. Thus, with each delta page 216 representing an update to a same base page 214, each system timestamp therefore determines the order that those updates are applied to the base page 214. Furthermore, the KV store engine may be configured to append multiple delta pages 216 to a delta chain 218 of the same base page 214 in timestamp order, so that traversal of the delta chain 218 iterates through each delta chain 216 in timestamp order, such that delta chains 216 may be scanned in one traversal rather than multiple traversals.

According to example embodiments of the present disclosure, the KV store engine may be configured to traverse each delta chain based on a snapshot read timestamp of a snapshot query. The snapshot read timestamp indicates that the KV store engine should return each delta page reflecting an update as of the time of the snapshot read timestamp or earlier than the time of the snapshot read timestamp. Thus, the KV store engine may disregard each delta page having a system timestamp larger than the snapshot read timestamp, and may read each delta page having a system timestamp smaller than or equal to the snapshot read timestamp. The KV store engine may ultimately return each delta page read during traversal in response to the snapshot query.

Furthermore, according to example embodiments of the present disclosure, the KV store engine may further implement a first recovery log and a second recovery log (not illustrated). The first recovery log and the second recovery log may each be sequentially-written data structures, where the KV store engine is configured to record updates to pages of the indexed sorted data structure 204 in the first recovery log, and record updates to the page mapping table 212 to the second recovery log. By such implementations the KV store engine may perform at least two types of recovery operations: in the event of a failure of the storage system, the KV store may replay the second recovery log to restore physical-to-virtual address mapping. Moreover, the KV store engine may maintain read replicas in up-to-date states by constantly replaying the second recovery log. In either case, the KV store engine may further replay the first recovery log to further restore the latest updates to the indexed sorted data structure 204, which have not yet necessarily been flushed to storage.

Figure 4A:
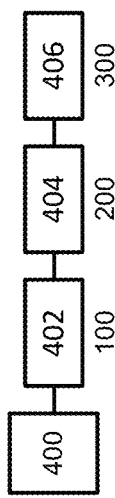
FIG. 4A illustrates a PID of a base page, where a delta chain of multiple delta pages has been appended to the base page.

FIG. 4A illustrates a PID of a base page 400 (the PID having been mapped to a physical page address, which is not illustrated herein), where a delta chain of multiple delta pages has been appended to the base page (and thus appended to the PID of the base page). Herein and for subsequent reference, the PID of the base page 400 is referred to as $PID_1$, and the three delta pages are referred to as 402, 404, and 406. These delta pages have system timestamps 100, 200, and 300, respectively, by way of example.

According to example embodiments of the present disclosure, while delta chains may grow indefinitely to arbitrary lengths, upon delta chains growing to substantial lengths, traversal of the full delta chain may result in heightened read amplification. Consequently, example embodiments of the present disclosure further implement a consolidation operation. In the event that a length of a delta chain of a base page grows equal or larger than a length threshold (such as, by way of example, three delta pages), the KV store engine consolidates delta pages appended to a base page by performing a merge-sort operation upon each delta page of a delta chain to the base page. In particular, the KV store engine may consolidate delta pages appended to a base page with each other and with the base page (subsequently referenced as an "overwrite" of the base page) in the event that the delta pages of the delta chain are, collectively, larger than the base page by a comparative ratio (such as, by way of example, 25%; or, equivalently, the base page is smaller than the collective delta pages of the delta chain by a comparative ratio). Alternatively, in the event that the comparative ratio is small, the base page is not consolidated (subsequently referenced as a "partial consolidation" of the base page), so as to avoid growing write amplification unnecessarily.

Additionally, in the event that delta pages and the base page together are consolidated into more than one base page, the KV store engine may rewrite the consolidated base pages into multiple new base pages.

Consolidation of a long delta chain may reduce the page mapping table to arbitrarily small sizes, consequently reducing read time spent in traversal of the full delta chain, and thus alleviating read amplification.

Conditions as described above which cause a KV store engine to consolidate delta pages may be generally referred to herein as "consolidation conditions." Each consolidation operation may be manually configurable by an operator of a storage system or a storage host as described herein.

Additionally, upon performing a merge-sort operation upon delta pages and optionally upon a base page, the KV store engine derives some number of merge-sorted records, and respective corresponding keys. The KV store engine then completes the consolidation operation by creating one or more new pages containing the merge-sorted records, and respective corresponding keys. Whether one new page or multiple new pages are created depends on a maximum page size as configured for the KV store engine. The one or more new pages may be appended to a page stream as described above.

The one or more new pages may be written by the KV store engine performing a replace operation, wherein the KV store engine creates a k-way merge iterator to the delta chain containing the merge-sorted delta pages, identifying a highest system timestamp among the delta pages. Furthermore, in the event that the base page is consolidated, the KV store engine sets an overwrite flag in the mapping data structure of the base page, as the base page is to be overwritten (in the event that one new page is written), or rewritten (in the event that multiple new pages are written). An overwrite flag being set may configure the mapping of the base page as invalid in the indexed sorted data structure 204, while indicating that the first delta page of a delta chain is the (new) base page.

However, after completion of such a consolidation operation, the delta chain of the parent index page (either the base page in the event that the base page is not consolidated, or a new base page to be created in the event that the base page is consolidated) does not need to be updated immediately. Instead, the KV store engine may side-chain the one or more new pages to the pre-consolidation delta chain, causing both chains to coexist from the same parent base page, with the parent base page pointing to the one or more new pages, while the pre-consolidation delta chain becomes a side delta chain. In particular, side-chaining may support ongoing, unfinished read operations at past read timestamps; if the delta chain were replaced immediately, ongoing read operations may retrieve delta pages having future timestamps, causing erroneous read behavior.

Figure 4B:
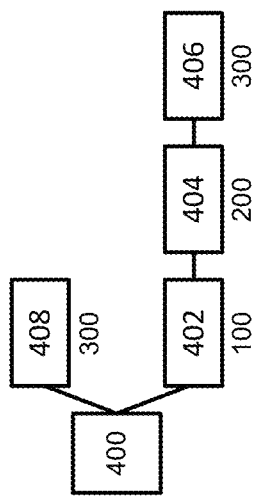
FIG. 4B illustrates performing a partial consolidation upon the delta chain of FIG. 4A.

FIG. 4B illustrates performing a partial consolidation upon the delta chain of FIG. 4A. The KV store engine performs a merge-sort operation upon the delta pages 402, 404, and 406, creating a delta page 408. The delta page 408 has the largest system timestamp among system timestamps of the original delta pages 402, 404, and 406; thus, the system timestamp of the delta page 408 is 300. The KV store engine side-chains the delta page 408 to the base page 400, so that the base page 400 now points to the delta page 408, while the pre-consolidation delta chain becomes a side delta chain.

Consequently, according to FIG. 4B, the KV store engine traversing the base page 400 to service a snapshot query may find a first pointer pointing to the delta page 408 and a second pointer pointing to the side delta chain; at the first pointer, the KV store engine finds that the delta page 408 has a larger timestamp than the delta page 402 at the second pointer. Thus, the KV store engine proceeds to traverse the delta page 408, retrieving a merged view of the base page 400 and the delta page 408 in response to the snapshot query.

Figure 4C:
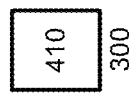
FIG. 4C illustrates performing an overwrite upon the base page of FIG. 4A.

FIG. 4C illustrates performing an overwrite upon the base page of FIG. 4A. The KV store engine performs a merge-sort operation upon the base page 400 and the delta pages 402, 404, and 406, creating a base page 410. The base page 410 has the largest system timestamp among system timestamps of the original delta pages 402, 404, and 406; thus, the system timestamp of the base page 410 is 300.

Consequently, according to FIG. 4C, the KV store engine traversing the base page 410 to service a snapshot query may find a base page with no pointers pointing to any delta pages. Thus, the KV store engine retrieves a view of the base page 410 in response to the snapshot query.

Figure 4D:
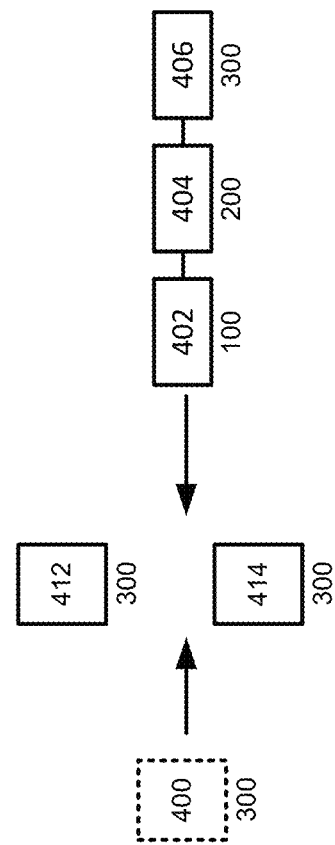
FIG. 4D illustrates performing a rewrite upon the base page of FIG. 4A.

FIG. 4D illustrates performing a rewrite upon the base page of FIG. 4A. The KV store engine a merge-sort operation upon the base page 400 and the delta pages 402, 404, and 406, creating two base pages 412 and 414. The parent page of the base page 400 is linked to the new base pages 412 and 414; the base page 400 is marked as stale for reclamation.

Additionally, it should be understood that, during a consolidation operation (which may be performed concurrently with checkpoint operations), in the event of a partial consolidation, since updates performed concurrently are limited to appends of delta pages and consolidations of delta pages, the tree structure of the indexed sorted data structure 204 is not changed; thus, resulting updates to the mapping table 212 may be performed in timestamp order.

Figure 4E:
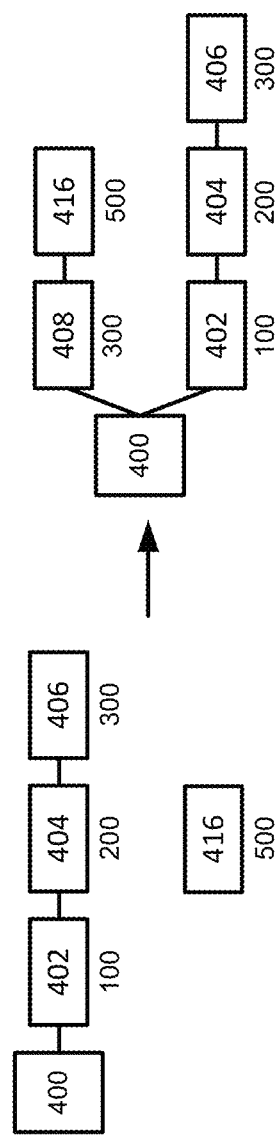
FIG. 4E illustrates performing a partial consolidation and an append concurrently upon the base page of FIG. 4A.

FIG. 4E illustrates performing a partial consolidation and an append concurrently upon the base page of FIG. 4A. The KV store engine concurrently performs a merge-sort operation upon the delta pages 402, 404, and 406 chained to the base page 400, alongside an append of the delta page 416 (having system timestamp 500) to the base page 400. Thus, the consolidation operation, resulting in the base page 408 having system timestamp 300, is followed by appending the delta page 416 having system timestamp 500 to the base page 410.

Additionally, in the event of a rewrite, since updates performed concurrently will result in changing the tree structure of the indexed sorted data structure 204; thus, during resulting updates to the mapping table 212, the KV store engine may create a rewrite table (as subsequently described in further detail); it should be understood that by reference to a rewrite table, the KV store engine may be configured to perform the consolidation operation in the nature of a rewrite concurrently alongside checkpoint operations by appending delta pages to a parent base page rather than a child base page which has been invalidated during a consolidation operation having an earlier timestamp than the delta pages. The rewrite table may be discarded after all snapshot queries having snapshot read timestamps less than or equal to the system timestamp of the rewrite are completed.

Figure 4F:
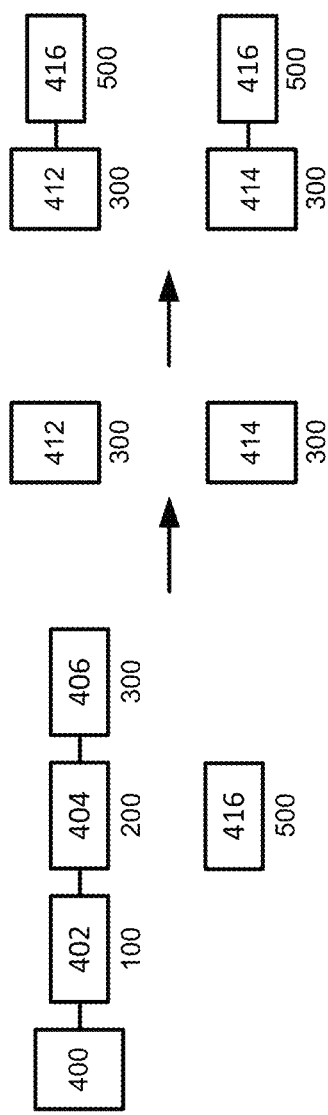
FIG. 4F illustrates performing a rewrite and an append concurrently upon the base page of FIG. 4A.

FIG. 4F illustrates performing a rewrite and an append concurrently upon the base page of FIG. 4A. The KV store engine concurrently performs a merge-sort operation upon the delta pages 402, 404, and 406 chained to the base page 400, alongside an append of the delta page 416 (having system timestamp 500) to the base page 400. Thus, the consolidation operation creates two base pages 412 and 414. The parent page of the base page 400 is linked to the new base pages 412 and 414; the base page 400 is marked as stale for reclamation. Thus, delta page 416 cannot be appended until base pages 412 and 414 are both linked to a parent page.

It should be understood that both base page 412 and base page 414 include sub-ranges of the original key range of base page 400. Consequently, the delta page 416 may include updates to both base page 412 and base page 414. Thus, appending delta page 416 requires adding two mappings to the page mapping table: a first mapping of delta page 416 to the PID of base page 412, and a second mapping of delta page 416 to the PID of base page 414.

Figure 5A:
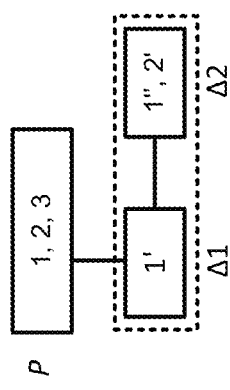
FIGS. 5A through 5C illustrate a consolidation operation and a side-chaining performed by a KV store engine according to example embodiments of the present disclosure.
Figure 5B:
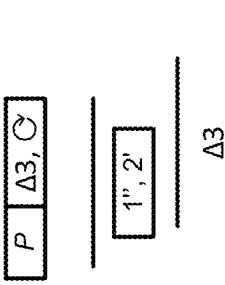
Figure 5C:
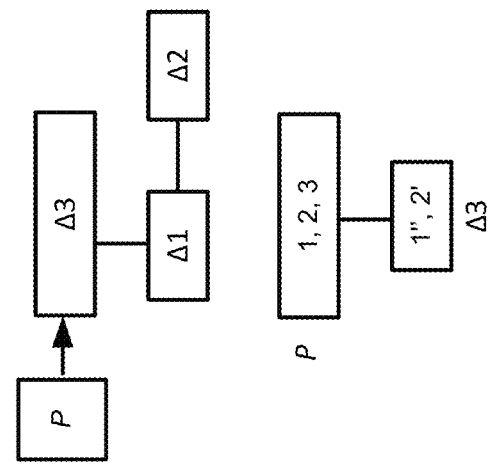

FIGS. 5A through 5C illustrate a consolidation operation and a side-chaining performed by a KV store engine according to example embodiments of the present disclosure. Herein, the PID of the base page is referred to as "P," and the two delta pages are referred to as "Δ1" and "Δ2."

FIG. 5A illustrates updates described by the two delta pages Δ1 and Δ2 to the base page P. It may be seen that the base page P includes records 1, 2, and 3. The delta page Δ1 describes a first updated record keyed 1, notated as 1'. The delta page Δ2 describes a second updated record keyed 1 (which must follow the first update 1'), notated as 1", and an updated record keyed 2, notated as 2'.

FIG. 5B illustrates results of a consolidation operation performed upon the two delta pages Δ1 and Δ2 appended to the base page P. Between the state illustrated in FIG. 4A and the state illustrated in FIG. 4B, it should be understood that, first, the delta pages Δ1 and Δ2 were merge-sorted, resulting in the updated records 1" and 2'. Then, a new delta page Δ3 was created, containing the updated records 1" and 2'. (In this example, the base page P was not consolidated with the delta pages of its delta chain.) FIG. 4B show that the new delta page Δ3 is then written to a page stream of the base page P, causing a local update to the base page P. It should further be understood that the latest system timestamp among the delta pages Δ1 and Δ2 becomes the system timestamp of Δ3.

FIG. 5C illustrates results of a side-chaining operation performed upon the two delta pages Δ1 and Δ2 and the new delta page Δ3. As shown, the new delta page Δ3 is written to the page stream, where it has a physical page address. The KV store engine replaces the physical page address in the mapping data structure of the base page P with the physical page address, and replaces the system timestamp of the mapping data structure of the base page P with the system timestamp of Δ3 (carried over from the latest system timestamp among the delta pages Δ1 and Δ2). The KV store engine also updates the retiring chain pointer of the mapping data structure of the base page P to point to the side delta chain containing the delta pages Δ1 and Δ2.

According to example embodiments of the present disclosure, the KV store engine may perform a consolidation operation upon the KV store engine detecting a consolidation trigger condition being satisfied. For example, a consolidation trigger condition may constitute any delta chain of the indexed sorted data structure 204 exceeds a certain size, measured in number of delta pages. Alternatively and/or additionally, a consolidation trigger condition may constitute the total number of delta pages of the entire indexed sorted data structure 204 (not just those delta pages of one delta chain) exceeds a certain number.

According to example embodiments of the present disclosure, it should be further understood that a consolidation operation and a side-chaining operation as described above do not modify the structure of the indexed sorted data structure 204. Thus, a KV store engine according to example embodiments of the present disclosure further implements a tree growing operation and a tree shrinking operation.

Additionally, it should be understood that side delta chains do not persist indefinitely; gradually, past read operations will complete and all ongoing read operations will no longer have read timestamps which are earlier than a latest timestamp of the retiring chain. Subsequent to this condition being satisfied, the side delta chain may be marked as stale data to be reclaimed by a garbage collection process. The garbage collection process may be implemented according to epoch-based garbage collection as known to persons skilled in the art, by implementing and incrementing a garbage collection timestamp which lags behind read timestamps of ongoing read operations. The garbage collection process may be operative to reclaim storage occupied by stale data, such as frozen, immutable write buffers after checkpointing; pages invalidated by various operations as described herein; and the like.

Additionally, according to example embodiments of the present disclosure, the KV store engine may implement a garbage collection process which maintains an advancing garbage collection timestamp. Based on the garbage collection timestamp, the garbage collection process executes in iterations, incrementing the garbage collection timestamp during each iteration. During each iteration of the garbage collection process, the garbage collection process may relocate valid pages of the indexed sorted data structure 204 to the tails of the first page stream and the second page stream. The garbage collection process may then update the page mapping table 212 to reflect the relocated pages.

As described above, pages become stale upon no more operations having earlier timestamps. Thus, delta pages are more likely to become stale, and become stale with greater frequency, than base pages. The first page stream, consequently, is referred to herein as a "hot" stream due to the greater frequency of non-stale base pages, while the second page stream is referred to herein as a "cold" stream. The KV store engine may be configured to reclaim storage occupied by pages from only one stream, thus improving efficiency of garbage collection.

Figure 5D:
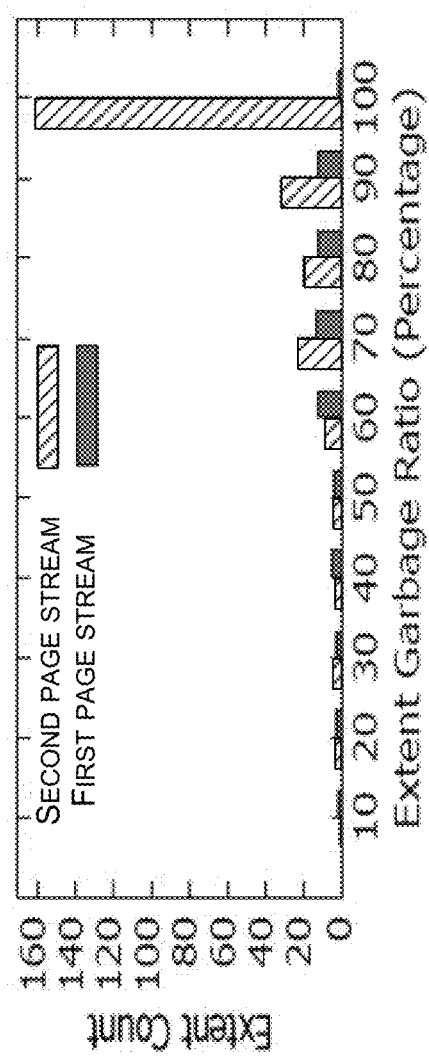
FIG. 5D illustrates a histography of distribution of extent garbage ratios in a first page stream and a second page stream according to example embodiments of the present disclosure.

FIG. 5D illustrates a histography of distribution of extent garbage ratios in a first page stream and a second page stream according to example embodiments of the present disclosure (technical specifications of an experimental computing system are described subsequently with reference to FIG. 8). A KV store engine according to example embodiments of the present disclosure ingested 100 million key-values without GC. The second page stream contains more extents, and a higher proportion of stale pages, than the first page stream, illustrating the different update frequencies and storage separation based on page type as described above. After ingestion, the second page stream and the first page stream are 9.5 GB and 27 GB, respectively, in size.

According to example embodiments of the present disclosure, a KV store engine performs a tree growing operation upon a parent index page upon delta chains of the parent index page, created as described above in a consolidation operation, and/or side delta chains of the parent index page, created as described above in a side-chaining operation, growing over a growing threshold in size. The KV store engine then splits the parent index page into multiple pages, which are set as child pages of a new parent index page, where each page may be under a maximum page size as described above. The creation of new child pages may furthermore add a new bottommost level to the indexed sorted data structure 204.

According to example embodiments of the present disclosure, a KV store engine performs a tree shrinking operation upon a parent index page upon delta chains of the parent index page and/or side delta chains of the parent index page falling under a shrinking threshold in size. The KV store engine may then append a merge recipient delta page to the parent index page (in the manner as described above of creating a merge recipient delta page in a page stream, then recording a physical page address of the merge recipient in a mapping data structure of the parent index page). The merge recipient data page may then perform a page rewriting operation, causing one or more child pages of the parent index page to be collectively merge-sorted into a collection of records, which are then written into the merge recipient data page. In this operation, the KV store engine also updates the page mapping table 212 to reflect invalidation of the child pages which have been merged.

Alternatively and/or additionally, the KV store engine performs a tree shrinking operation upon the parent index page itself falling under a shrinking threshold in size. Instead of appending a merge recipient data page to the parent index page, the KV store engine may then perform a page rewriting operation, causing one or more child pages of the parent index page to be collectively merge-sorted with the parent index page. In this operation, the KV store engine also updates the page mapping table 212 to reflect invalidation of the child pages which have been merged.

Generally, shrinking thresholds may be configured so as to rarely trigger tree shrinking operations (i.e., the thresholds are set sufficiently low as to be rarely reached). Such configurations may avoid performing excessive merge-sorting and page rewriting, which may result in greater performance costs than performance benefits.

Furthermore, a KV store engine according to example embodiments of the present disclosure implements a rewrite table, wherein the KV store engine may record pages generated by page rewriting operations as described above. Checkpoint operations and page rewriting operations as described above, if performed concurrently, may lead to erroneous results, since checkpoint operations may append delta pages to base pages which are concurrently rewritten and thus made obsolete. Thus, during a page rewriting operation, the KV store engine further records each page rewrite in the rewrite table. While performing a checkpoint operation, the KV store engine may refer to the rewrite table, comparing system timestamps of the rewrite table to system timestamps of delta pages to be flushed to storage. By reference to the rewrite table, the KV store engine may be configured to perform the checkpoint operation by appending delta pages to a parent index page rather than a child page which has been invalidated during a page rewriting operation having an earlier timestamp than the delta pages. The rewrite table may be discarded after all snapshot queries having snapshot read timestamps less than or equal to the system timestamp of the checkpoint operation are completed.

Furthermore, based on the above-described indexed sorted data structure 204 and KV store engine operations, the KV store engine may perform a delete operation upon the indexed sorted data structure 204. The KV store engine may delete any base page of the indexed sorted data structure 204 by appending an empty delta page to the base page, the empty delta page having a deletion flag set and a deletion timestamp. The KV store engine does not perform the deletion operation until timestamps of all other ongoing operations are later than the deletion timestamp, since concurrent operations referencing deleted pages must be caused to fail. Deletions are further recorded in the rewrite table, as described above, ensuring that the KV store engine may identify pages made invalid by deletion while performing concurrent checkpoint operations and the like.

Figure 6A:
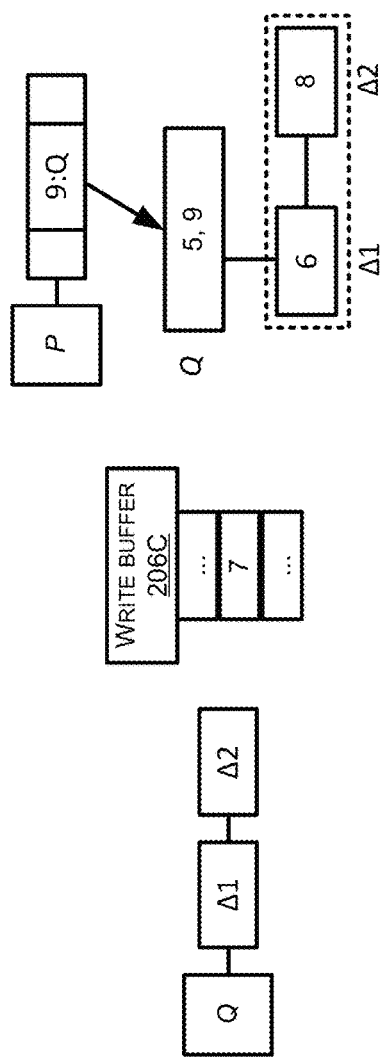
FIGS. 6A through 6C illustrate a KV store engine performing a checkpoint operation and a page rewriting operation concurrently with reference to a rewrite table.
Figure 6B:
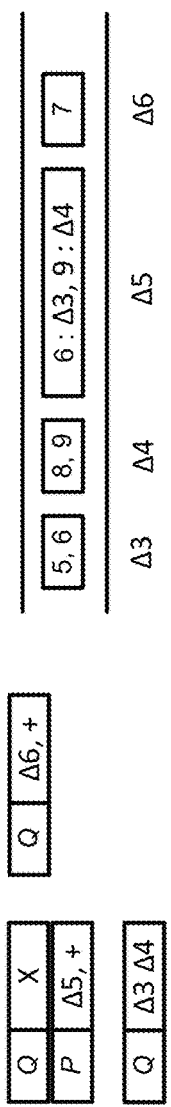
Figure 6C:
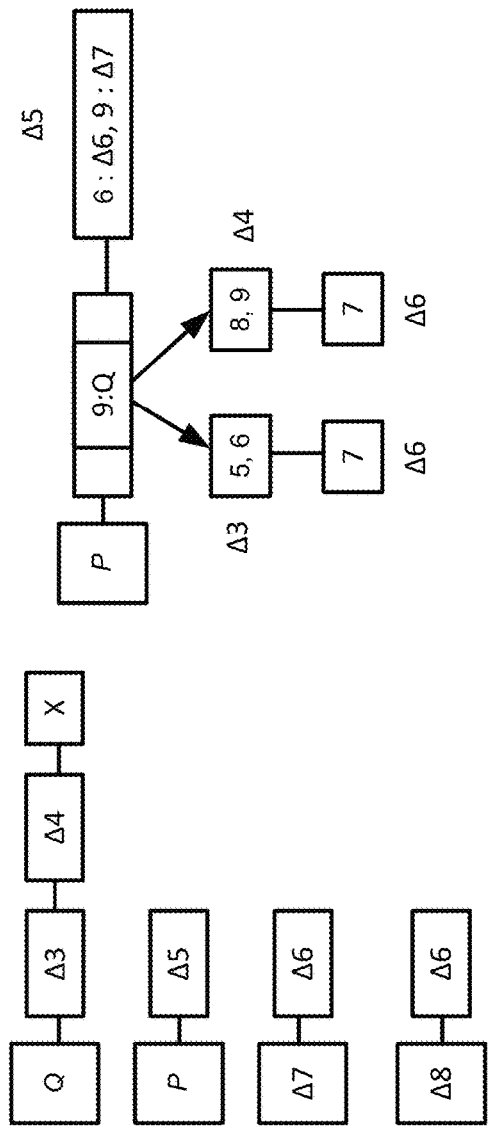

FIGS. 6A through 6C illustrate a KV store engine performing a checkpoint operation and a page rewriting operation concurrently with reference to a rewrite table. FIG. 6A shows that a write buffer 206C has received an update to a record keyed 7. This update, upon being checkpointed, may be appended to a page stream as a delta page in the order of its system timestamp. FIG. 6A also shows that a parent page having PID P has a child page having PID Q, the page Q having records keyed ranging from 5 to 9, and having a delta chain including delta page Δ1 updating the record keyed 6, and delta page Δ2 updating the record keyed 8. Suppose, for the purpose of illustration, that the KV store engine is concurrently performing a shrink operation to merge the child page Q into the parent page P, and thus the child page Q having records keyed ranging from 6 to 9 will no longer be valid for the concurrent checkpoint update to the record keyed 7.

FIG. 6B shows that the operations as described in FIG. 6A are recorded in a rewrite table and appended into a page stream in timestamp order. Since the record keyed 7 will be updated by the checkpoint operation, it is recorded in the rewrite table targeting the child page Q and having a timestamp Δ6, while the remaining records of the child page Q (ranging from 5 to 6, and ranging from 8 to 9) are written into new pages at earlier timestamps, recorded in the rewrite table targeting the child page Q and having timestamps Δ3 and Δ4. The child page Q is then merge-sorted into the parent page P at timestamp Δ5, resulting in the child page Q also being marked for deletion (denoted by "X"). The append order in the page stream reflects the order of these timestamps.

FIG. 6C shows that each of the appends of the page stream are applied to respective pages at their respective timestamps; the rewrite results in two delta chains of the parent page P created at Δ3 and Δ4, respectively, and the update at Δ6 results in a further delta page on each of those chains created at Δ7 and Δ8, respectively.

Figure 7:
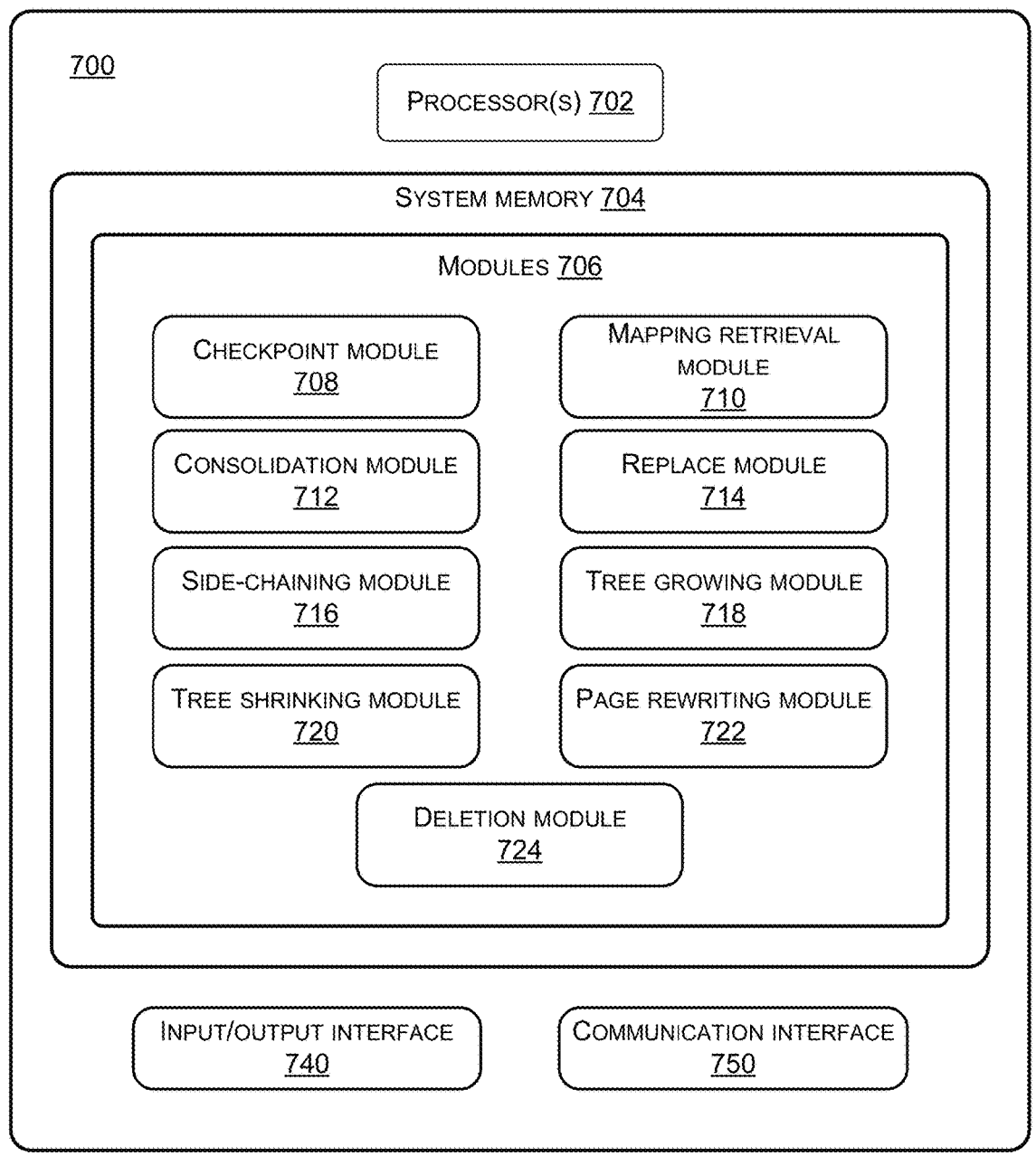
FIG. 7 illustrates an example storage system for implementing the processes and methods described herein making up a KV store engine.

FIG. 7 illustrates an example storage system 700 for implementing the processes and methods described above making up a KV store engine.

The techniques and mechanisms described herein may be implemented by multiple instances of the system 700, as well as by any other computing device, system, and/or environment. The system 700 may be one or more computing systems of a cloud computing system providing physical or virtual computing and storage resources as known by persons skilled in the art. The system 700 shown in FIG. 7 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 700 may include one or more processors 702 and system memory 704 communicatively coupled to the processor(s) 702. The processor(s) 702 and system memory 704 may be physical or may be virtualized and/or distributed. The processor(s) 702 may execute one or more modules and/or processes to cause the processor(s) 702 to perform a variety of functions. In embodiments, the processor(s) 702 may include a central processing unit ("CPU"), a graphics processing unit ("GPU"), both CPU and GPU, or other processing units or components known in the art. Additionally, each of the processor(s) 702 may possess its own local memory, which also may store program modules, program data, and/or one or more operating systems.

Depending on the exact configuration and type of the system 700, the system memory 704 may be volatile, such as RAM, non-volatile, such as ROM, flash memory, miniature hard drive, memory card, and the like, or some combination thereof. The system memory 704 may include one or more computer-executable modules 706 that are executable by the processor(s) 702.

The modules 706 may include, but are not limited to, a checkpoint module 708, a mapping retrieval module 710, a consolidation module 712, a replace module 714, a side-chaining module 716, a tree growing module 718, a tree shrinking module 720, a page rewriting module 722, and a deletion module 724.

The checkpoint module 708 may be configured to perform a checkpoint operation as described above with reference to FIGS. 2 through 3C.

The mapping retrieval module 710 may be configured to perform a mapping retrieval operation as described above with reference to FIG. 2.

The consolidation module 712 may be configured to perform a consolidation operation as described above with reference to FIGS. 4A through 4F and FIGS. 5A through 5C, including partial consolidations, overwrites and rewrites.

The replace module 714 may be configured to perform a replace operation as described above with reference to FIG. 4A.

The side-chaining module 716 may be configured to perform a side-chaining operation as described above with reference to FIGS. 5A through 5C.

The tree growing module 718 may be configured to perform a tree growing operation as described above.

The tree shrinking module 720 may be configured to perform a tree shrinking operation as described above with reference to FIGS. 6A through 6C.

The page rewriting module 722 may be configured to perform a page rewriting operation as described above with reference to FIG. 4F and FIGS. 6A through 6C.

The deletion module 724 may be configured to perform a deletion operation as described above.

The storage system 700 may additionally include an input/output (I/O) interface 740 and a communication module 750 allowing the storage system 700 to communicate with other systems and devices over a network, such as a cloud network as described above with reference to FIG. 1. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-6C. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The below figures and tables illustrate comparative performance of the above-mentioned methodologies, compared against RocksDB as described above. The experiments are conducted on a dual-socket server system having two Intel Xeon Platinum 8276L 2.20 GHz CPUs, each configured with 28 physical cores (56 logical cores) and a 38.5 MB L3 cache. The experimental system further includes 192 GB DDR4 DRAM and one 2 TB Intel P4510 NVMe SSD. The experimental system runs Ubuntu Server with kernel 5.4.0-53.

The experimental data set size is 32 GB, including 200 million records, each record including a 32-byte key and a 128-byte value. The experimental system has a memory cache budget of 8 GB, i.e. a 25% data to cache ratio. Due to fundamental implementation differences, the memory cache is allocated differently, but similarly, for each experiment: configuring an example embodiment of the present disclosure, this budget is evenly distributed between the delta and base page caches. RocksDB is configured to utilize this budget for block cache including data and index blocks.

Multitasking is configured in both experiments: according to example embodiments of the present disclosure, user-level cooperative multitasking is configured. RocksDB is configured for traditional preemptive multitasking supported by OS; sufficient client threads are configured to reach maximum ingestion performance. CPU utilization for RocksDB is configured to be higher out of the two cases, to eliminate computational bottleneck as a source of performance difference.

Figure 8:
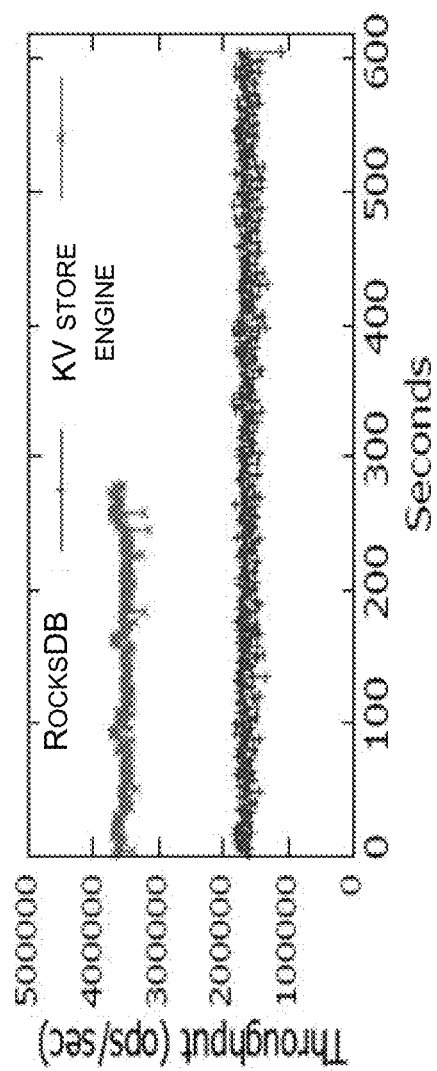
FIG. 8 illustrates a throughput curve comparing RocksDB and a KV store engine according to example embodiments of the present disclosure.

FIG. 8 illustrates a throughput curve comparing RocksDB and a KV store engine according to example embodiments of the present disclosure. In both cases, an ingest-only workload was ingested, and two workloads from Yahoo! Cloud Serving Benchmark ("YCSB"), YCSB-A (50% updates; 50% point lookups) and YCSB-E (5% inserts; 95% scans, averaging 50 key-values per scan), were ingested. Each workload starts with a prepopulated B+ tree with 100 million uniformly distributed key-values. As illustrated in FIG. 8, after 100 million uniformly distributed key-value updates, the KV store engine exhibited average throughput of 346,000 operations per second, approximately 216% of RocksDB's average throughput of 162,000 operations per second. The KV store engine exhibited write amplification of 3.1, about ⅓ that of RocksDB's 9.5. Moreover, the KV store engine exhibited relative standard deviation of 2.86%, compared to 12.99% for RocksDB.

In practice, a KV store engine according to example embodiments of the present disclosure effectively reduces write amplification and performs consistently in write operations, due to a combination of advantages as described herein.

By the abovementioned technical solutions, the present disclosure provides a key-value store implementing multiple-tiered sorted data structures in memory and storage, including concurrent write buffers in memory, and page-level consolidation of updates on storage, where pages are trivially translated in physical-to-virtual address mapping. The key-value store is built on an indexed sorted data structure on storage, occupying much less storage space and incurring much less disk activity in consolidating updates than a conventional log-structured merge tree organized into files. Concurrent write buffers operate concurrently and independently so that data is committed from memory to storage in an efficient manner, while maintaining chronological sequence of delta pages. Trivial mapping allows mappings of a number of physical pages to be omitted, enabling page mapping tables to occupy less storage space, and simplifying processing workload of read operation retrievals from storage.

EXAMPLE CLAUSES

A. A method comprising: receiving a plurality of inserted record updates at a first write buffer in memory of a storage system; appending the plurality of inserted record updates to a page stream on storage of the storage system as a page; and writing an indexed sorted data structure to the storage, the indexed sorted data structure comprising a virtual page trivially mapped to the page of the page stream.

B. The method as paragraph A recites, wherein the first write buffer is operative to store each inserted record update in a sorted order.

C. The method as paragraph A recites, further comprising freezing the first write buffer; and creating a second write buffer in the memory operative to receive record updates.

D. The method as paragraph A recites, wherein a page comprises a plurality of keys corresponding to records not stored in the indexed sorted data structure.

E. The method as paragraph A recites, wherein the indexed sorted data structure further comprises a page mapping table, and the page mapping table comprises a mapping from the virtual page to the page of the page stream.

F. The method as paragraph E recites, wherein the page mapping table is arbitrarily small in size.

G. The method as paragraph A recites, wherein appending the plurality of inserted record updates comprises substantially concurrently appending to a first page stream as a base page and appending to a second page stream as a delta page.

H. The method as paragraph E recites, wherein a delta page further comprises a system timestamp, and each delta page is appended to the second page stream in order of system timestamps.

I. The method as paragraph A recites, further comprising consolidating a plurality of delta pages of a delta chain appended to the virtual page.

J. The method as paragraph E recites, wherein appending the plurality of inserted record updates is performed substantially concurrently as consolidating the plurality of delta pages of the delta chain; appending the plurality of inserted record updates comprises appending a delta page to the delta chain; and appending the plurality of inserted record updates is performed after consolidating the plurality of delta pages of the delta chain.

K. The method as paragraph E recites, further comprising writing at least one new page based on the consolidated plurality of delta pages, and appending the at least one new page to the page stream.

L. The method as paragraph E recites, wherein consolidating the plurality of delta pages further comprises consolidating the virtual page.

M. The method as paragraph L recites, wherein consolidating the plurality of delta pages further comprises writing at least one new page based on the consolidated plurality of delta pages and the virtual page, and linking a parent page of the virtual page to the at least one new page.

N. The method as paragraph L recites, wherein consolidating the plurality of delta pages further comprises creating a rewrite table.

O. The method as paragraph A recites, further comprising generating a system timestamp.

P. The method as paragraph A recites, further comprising splitting a page into a plurality of child pages.

Q. The method as paragraph A recites, further comprising merging a child page of the virtual page into the virtual page, and recording the rewriting of the child page into the virtual page in a rewrite table.

R. The method as paragraph Q recites, further comprising appending an inserted record update to the page stream; referencing the rewrite table; and appending a delta page comprising the inserted record update to the virtual page instead of the child page.

S. A storage system comprising: one or more processors; hosted storage; and memory communicatively coupled to the one or more processors, the memory storing computer-executable modules executable by the one or more processors that, when executed by the one or more processors, perform associated operations, the computer-executable modules comprising: a checkpoint module configured to receive a plurality of inserted record updates at a first write buffer in memory of a storage system; append the plurality of inserted record updates to a page stream on storage of the storage system as a page; and write an indexed sorted data structure to the storage, the indexed sorted data structure comprising a virtual page trivially mapped to the page of the page stream.

T. The system as paragraph S recites, wherein the first write buffer is operative to store each inserted record update in a sorted order.

U. The system as paragraph S recites, wherein the checkpoint module is further configured to freeze the first write buffer; and create a second write buffer in the memory operative to receive record updates.

V. The system as paragraph S recites, wherein a page comprises a plurality of keys corresponding to records not stored in the indexed sorted data structure.

W. The system as paragraph S recites, wherein the indexed sorted data structure further comprises a page mapping table, and the page mapping table comprises a mapping from the virtual page to the page of the page stream.

X. The system as paragraph W recites, wherein the page mapping table is arbitrarily small in size.

Y. The system as paragraph S recites, wherein the checkpoint module is configured to append the plurality of inserted record updates substantially concurrently to a first page stream as a base page and to a second page stream as a delta page.

Z. The system as paragraph W recites, wherein a delta page further comprises a system timestamp, and each delta page is appended to the second page stream in order of system timestamps.

AA. The system as paragraph S recites, further comprising a consolidating module configured to consolidate a plurality of delta pages of a delta chain appended to the virtual page as a new page.

AB. The system as paragraph W recites, wherein the checkpoint module is configured to append the plurality of inserted record updates substantially concurrently as the consolidating module consolidating the plurality of delta pages of the delta chain; the checkpoint module is configured to append the plurality of inserted record updates comprises appending a delta page to the delta chain; and the checkpoint module is configured to append the plurality of inserted record updates after the consolidating module consolidates the plurality of delta pages of the delta chain.

AC. The system as paragraph W recites, wherein the consolidating module is further configured to write at least one new page based on the consolidated plurality of delta pages, and append the at least one new page to the page stream.

AD. The system as paragraph W recites, wherein the consolidating module is further configured to consolidate the plurality of delta pages by consolidating the virtual page.

AE. The system as paragraph AD recites, wherein the consolidating module is further configured to consolidate the plurality of delta pages further by writing at least one new page based on the consolidated plurality of delta pages and the virtual page, and linking a parent page of the virtual page to the at least one new page.

AF. The system as paragraph AD recites, wherein the consolidating module is further configured to consolidate the plurality of delta pages by creating a rewrite table.

AG. The system as paragraph S recites, further comprising a tree growing module configured to split a page into a plurality of child pages.

AH. The system as paragraph S recites, further comprising a tree shrinking module configured to merge a child page of the virtual page into the virtual page, and record the rewriting of the child page into the virtual page in a rewrite table.

AI. The system as paragraph AH recites, wherein the checkpoint module is further configured to append an inserted record update to the page stream; reference the rewrite table; and append a delta page comprising the inserted record update to the virtual page instead of the child page.

AJ. A computer-readable storage medium storing computer-readable instructions executable by one or more processors, that when executed by the one or more processors, cause the one or more processors to perform operations comprising: receiving a plurality of inserted record updates at a first write buffer in memory of a storage system; appending the plurality of inserted record updates to a page stream on storage of the storage system as a page; and writing an indexed sorted data structure to the storage, the indexed sorted data structure comprising a virtual page trivially mapped to the page of the page stream.

AK. The computer-readable storage medium as paragraph AJ recites, wherein the first write buffer is operative to store each inserted record update in a sorted order.

AL. The computer-readable storage medium as paragraph AJ recites, wherein the operations further comprise freezing the first write buffer; and creating a second write buffer in the memory operative to receive record updates.

AM. The computer-readable storage medium as paragraph AJ recites, wherein a page comprises a plurality of keys corresponding to records not stored in the indexed sorted data structure.

AN. The computer-readable storage medium as paragraph AJ recites, wherein the indexed sorted data structure further comprises a page mapping table, and the page mapping table comprises a mapping from the virtual page to the page of the page stream.

AO. The computer-readable storage medium as paragraph AN recites, wherein the page mapping table is arbitrarily small in size.

AQ. The computer-readable storage medium as paragraph AJ recites, wherein appending the plurality of inserted record updates comprises substantially concurrently appending to a first page stream as a base page and appending to a second page stream as a delta page.

AR. The computer-readable storage medium as paragraph AN recites, wherein a delta page further comprises a system timestamp, and each delta page is appended to the second page stream in order of system timestamps.

AS. The computer-readable storage medium as paragraph AJ recites, wherein the operations further comprise consolidating a plurality of delta pages of a delta chain appended to the virtual page.

AT. The computer-readable storage medium as paragraph AN recites, wherein appending the plurality of inserted record updates is performed substantially concurrently as consolidating the plurality of delta pages of the delta chain; appending the plurality of inserted record updates comprises appending a delta page to the delta chain; and appending the plurality of inserted record updates is performed after consolidating the plurality of delta pages of the delta chain.

AU. The computer-readable storage medium as paragraph AN recites, wherein the operations further comprise writing at least one new page based on the consolidated plurality of delta pages, and appending the at least one new page to the page stream.

AV. The computer-readable storage medium as paragraph AN recites, wherein consolidating the plurality of delta pages further comprises consolidating the virtual page.

AW. The computer-readable storage medium as paragraph AV recites, wherein consolidating the plurality of delta pages further comprises writing at least one new page based on the consolidated plurality of delta pages and the virtual page, and linking a parent page of the virtual page to the at least one new page.

AX. The computer-readable storage medium as paragraph AV recites, wherein consolidating the plurality of delta pages further comprises creating a rewrite table.

AY. The computer-readable storage medium as paragraph AJ recites, wherein the operations further comprise splitting a page into a plurality of child pages.

AZ. The computer-readable storage medium as paragraph AJ recites, wherein the operations further comprise merging a child page of the virtual page into the virtual page, and recording the rewriting of the child page into the virtual page in a rewrite table.

BA. The computer-readable storage medium as paragraph AZ recites, wherein the operations further comprise appending an inserted record update to the page stream; referencing the rewrite table; and appending a delta page comprising the inserted record update to the virtual page instead of the child page.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving a plurality of inserted record updates at a first write buffer in memory of a storage system;
   appending the plurality of inserted record updates to a page stream on storage of the storage system as a page, wherein the storage comprises a file system; and
   writing an indexed sorted data structure to the storage, the indexed sorted data structure comprising a virtual page non-translatory mapped to the page of the page stream by a same offset address of a same extent address as the page on the storage, wherein the offset address and the extent address are each addressed by the file system.

2. The method of claim 1, wherein the first write buffer is operative to store each inserted record update in a sorted order; and
   further comprising:
   freezing the first write buffer; and
   creating a second write buffer in the memory operative to receive record updates.

3. The method of claim 1, wherein a page comprises a plurality of keys corresponding to records not stored in the indexed sorted data structure;
   wherein the indexed sorted data structure further comprises a page mapping table, and a mapping from the virtual page to the page of the page stream is not recorded in the page mapping table.

4. The method of claim 1, wherein appending the plurality of inserted record updates comprises substantially concurrently appending to a first page stream as a base page and appending to a second page stream as a delta page; and
   wherein a delta page further comprises a system timestamp, and each delta page is appended to the second page stream in order of system timestamps.

5. The method of claim 1, further comprising consolidating a plurality of delta pages of a delta chain appended to the virtual page, writing at least one new page based on the consolidated plurality of delta pages, and appending the at least one new page to the page stream; and
   wherein appending the plurality of inserted record updates is performed at least in part concurrently as consolidating the plurality of delta pages of the delta chain;
   appending the plurality of inserted record updates comprises appending a delta page to the delta chain; and
   appending the plurality of inserted record updates is performed after consolidating the plurality of delta pages of the delta chain.

6. The method of claim 1, further comprising consolidating a plurality of delta pages of a delta chain appended to the virtual page with the virtual page;
   wherein consolidating the plurality of delta pages further comprises writing at least one new page based on the consolidated plurality of delta pages and the virtual page, and linking a parent page of the virtual page to the at least one new page; and
   wherein consolidating the plurality of delta pages further comprises creating a rewrite table.

7. The method of claim 1, further comprising merging a child page of the virtual page into the virtual page, and recording the rewriting of the child page into the virtual page in a rewrite table; appending an inserted record update to the page stream;

referencing the rewrite table; and appending a delta page comprising the inserted record update to the virtual page instead of the child page.

8. A storage system comprising:
one or more processors;
hosted storage; and
memory communicatively coupled to the one or more processors, the memory storing computer-executable modules executable by the one or more processors that, when executed by the one or more processors, perform associated operations, the computer-executable modules comprising:
a checkpoint module configured to receive a plurality of inserted record updates at a first write buffer in memory of a storage system; append the plurality of inserted record updates to a page stream on storage of the storage system as a page, wherein the storage comprises a file system; and write an indexed sorted data structure to the storage, the indexed sorted data structure comprising a virtual page non-translatory mapped to the page of the page stream by a same offset address of a same extent address as the page on the storage; wherein the offset address and the extent address are each addressed by the file system.

9. The system of claim 8, wherein the first write buffer is operative to store each inserted record update in a sorted order; and
wherein the checkpoint module is further configured to freeze the first write buffer, and create a second write buffer in the memory operative to receive record updates.

10. The system of claim 8, wherein a page comprises a plurality of keys corresponding to records not stored in the indexed sorted data structure; wherein the indexed sorted data structure further comprises a page mapping table, and a mapping from the virtual page to the page of the page stream is not recorded in the page mapping table.

11. The system of claim 8, wherein the checkpoint module is configured to append the plurality of inserted record updates at least in part concurrently to a first page stream as a base page and to a second page stream as a delta page; and
wherein a delta page further comprises a system timestamp, and each delta page is appended to the second page stream in order of system timestamps.

12. The system of claim 8, further comprising a consolidating module configured to consolidate a plurality of delta pages of a delta chain appended to the virtual page as a new page, write at least one new page based on the consolidated plurality of delta pages, and append the at least one new page to the page stream; and
wherein the checkpoint module is configured to append the plurality of inserted record updates at least in part concurrently as the consolidating module consolidating the plurality of delta pages of the delta chain; the checkpoint module is configured to append the plurality of inserted record updates comprises appending a delta page to the delta chain; and the checkpoint module is configured to append the plurality of inserted record updates after the consolidating module consolidates the plurality of delta pages of the delta chain.

13. The system of claim 8, wherein the consolidating module is further configured to consolidate a plurality of delta pages of a delta chain appended to the virtual page with the virtual page;
wherein the consolidating module is further configured to consolidate the plurality of delta pages further by writing at least one new page based on the consolidated plurality of delta pages and the virtual page, and linking a parent page of the virtual page to the at least one new page; and
wherein the consolidating module is further configured to consolidate the plurality of delta pages by creating a rewrite table.

14. The system of claim 8, further comprising a tree shrinking module configured to merge a child page of the virtual page into the virtual page, and record the rewriting of the child page into the virtual page in a rewrite table; and
wherein the checkpoint module is further configured to append an inserted record update to the page stream; reference the rewrite table; and append a delta page comprising the inserted record update to the virtual page instead of the child page.

15. A computer-readable storage medium storing computer-readable instructions executable by one or more processors, that when executed by the one or more processors, cause the one or more processors to perform operations comprising:
receiving a plurality of inserted record updates at a first write buffer in memory of a storage system;
appending the plurality of inserted record updates to a page stream on storage of the storage system as a page, wherein the storage comprises a file system; and
writing an indexed sorted data structure to the storage, the indexed sorted data structure comprising a virtual page non-translatory mapped to the page of the page stream by a same offset address of a same extent address as the page on the storage, wherein the offset address and the extent address are each addressed by the file system.

16. The computer-readable storage medium of claim 15, wherein the first write buffer is operative to store each inserted record update in a sorted order; and
wherein the operations further comprise:
freezing the first write buffer; and
creating a second write buffer in the memory operative to receive record updates.

17. The computer-readable storage medium of claim 15, wherein a page comprises a plurality of keys corresponding to records not stored in the indexed sorted data structure;
wherein the indexed sorted data structure further comprises a page mapping table, and a mapping from the virtual page to the page of the page stream is not recorded in the page mapping table.

18. The computer-readable storage medium of claim 15, wherein the operations further comprise consolidating a plurality of delta pages of a delta chain appended to the virtual page; and
wherein appending the plurality of inserted record updates is performed at least in part concurrently as consolidating the plurality of delta pages of the delta chain;
appending the plurality of inserted record updates comprises appending a delta page to the delta chain; and
appending the plurality of inserted record updates is performed after consolidating the plurality of delta pages of the delta chain.

19. The computer-readable storage medium of claim 15, further comprising consolidating a plurality of delta pages of a delta chain appended to the virtual page with the virtual page;
wherein consolidating the plurality of delta pages further comprises writing at least one new page based on the consolidated plurality of delta pages and the virtual page, and linking a parent page of the virtual page to the at least one new page; and wherein consolidating the plurality of delta pages further comprises creating a rewrite table.

20. The computer-readable storage medium of claim 15, wherein the operations further comprise merging a child page of the virtual page into the virtual page, and recording the rewriting of the child page into the virtual page in a rewrite table; and wherein the operations further comprise appending an inserted record update to the page stream; referencing the rewrite table; and appending a delta page comprising the inserted record update to the virtual page instead of the child page.

\* \* \* \* \*